(12) United States Patent
Hosseini et al.

(10) Patent No.: US 8,623,124 B2
(45) Date of Patent: Jan. 7, 2014

(54) POLYMER BLENDS AND CARBONIZED POLYMER BLENDS

(75) Inventors: Seyed Saeid Hosseini, Singapore (SG);
Tai-Shung Chung, Singapore (SG)

(73) Assignee: National University of Singapore, Singapore (SG)

( * ) Notice: Subject to any disclaimer, the term of this patent is extended or adjusted under 35 U.S.C. 154(b) by 251 days.

(21) Appl. No.: 13/122,843

(22) PCT Filed: Oct. 7, 2009

(86) PCT No.: PCT/US2009/059818
§ 371 (c)(1),
(2), (4) Date: Apr. 6, 2011

(87) PCT Pub. No.: WO2010/042602
PCT Pub. Date: Apr. 15, 2010

(65) Prior Publication Data
US 2011/0192281 A1    Aug. 11, 2011

Related U.S. Application Data

(60) Provisional application No. 61/103,547, filed on Oct. 7, 2008, provisional application No. 61/109,318, filed on Oct. 29, 2008.

(51) Int. Cl.
*B01D 53/22* (2006.01)
*B01D 71/06* (2006.01)
*C08L 79/08* (2006.01)

(52) U.S. Cl.
USPC ............ 96/4; 96/8; 96/10; 96/11; 96/13; 96/14; 95/45; 95/55; 521/27; 525/420

(58) Field of Classification Search
USPC ............ 96/4, 8, 10, 11, 13, 14; 95/45, 55, 56; 521/27; 525/420
See application file for complete search history.

(56) References Cited

U.S. PATENT DOCUMENTS

| | | | | |
|---|---|---|---|---|
| 4,842,740 A | * | 6/1989 | Chung et al. | 210/500.27 |
| 5,156,656 A | * | 10/1992 | Parker et al. | 96/11 |
| 6,503,295 B1 | | 1/2003 | Koros et al. | |
| 6,723,757 B1 | * | 4/2004 | Kerres et al. | 521/27 |
| 6,997,971 B1 | * | 2/2006 | Young et al. | 96/14 |
| 7,632,898 B2 | * | 12/2009 | Klaehn et al. | 96/14 |
| 2004/0261616 A1 | * | 12/2004 | Jorgensen et al. | 96/14 |
| 2005/0074654 A1 | * | 4/2005 | Kiefer et al. | 521/27 |
| 2006/0078774 A1 | * | 4/2006 | Uensal et al. | 521/27 |

OTHER PUBLICATIONS

Adhikari et al., "Hydrogen Membrane Separation Techniques" *Ind. Eng. Chem. Res.*, 2006, 45 (3), pp. 875-881.

Deffeyes et al., "Global Energy Prospects" Nature 4:487-488, 2001.

(Continued)

*Primary Examiner* — Jason M Greene
(74) *Attorney, Agent, or Firm* — Cesari and McKenna, LLP

(57) ABSTRACT

A composition includes a first polymer having monomers each containing an imidazole group, and a second polymer, the first and second polymers being a polymer blend. The first polymer, the second polymer, or both may be cross-linked. The carbonized composition, polymeric and carbon membranes (either in the form of a flat sheet or a hollow fiber) made from the composition are also described. The polymeric and carbon membranes can be used to separate and purify gases or liquids.

18 Claims, 10 Drawing Sheets

(56) References Cited

OTHER PUBLICATIONS

Hosseieni et al., "Hydrogen separation and purification in membranes of miscible polymer blends with interpenetration networks" Polymer 49:1594-1603, 2008.

Kapantaidakis et al., "Gas permeation through PSF-PI miscible blend membranes" J Memb Sci. 110:239-247, 1996.

Koros et al., "Pushing the limits on possibilities for large scale gas separation: which strategies?" J Memb Sci. 175:181-196, 2000.

Lin et al., "Gas transport properties of 6FDA-durene/1,4 phenylenediamine(pPDA) copolyimides" Journal of Polymer Science Part B: Polymer Physics 38:2703-2713, 2000.

Peramanu et al., "Economics of hydrogen recovery processes for the purification of hydroprocessor purge and off-gases" International Journal of Hydrogen Energy 24:405-424, 1999.

Ogden et al., "Prospects for building a hydrogen energy infrastructure" Annual review of energy and the environment, 24:227-279, 1999.

Stern et al., "Polymers for gas separations: the next decade" J Memb Sci. 94:1-65, 1994.

* cited by examiner (a)

(b)

(c)

(d)

(e)

Donor: C=O (Matrimid)
Acceptor: N-H (BPI)

(a)

(b)

(a)

(b)

POLYMER BLENDS AND CARBONIZED POLYMER BLENDS

CROSS REFERENCE TO RELATED APPLICATIONS

This application is the national stage entry under 35 USC 371 for: PCT/US2009/059818, filed on Oct. 7, 2009, which claims the benefit of the Oct. 7, 2008 priority date of U.S. application No. 61/103,547 and the benefit of the Oct. 29, 2008 priority date of U.S. application No. 61/109,318. The contents of the foregoing applications are incorporated herein by reference.

BACKGROUND

Hydrogen is recognized to play an important role as a reliable energy supply source in the near future. At present, steam reforming of hydrocarbons, such as natural gas, supplies about half of the world's demand for hydrogen gas. The yielded product from this process is a mixture. To obtain pure hydrogen, the mixture has to be subjected to a separation process to remove $CO_2$ and other undesired byproducts. One appropriate approach is using polymeric membranes by selective permeation mechanism.

Commercially available polymeric membranes have been applied in a variety of separation processes in the gas industry, for instance, hydrogen recovery from ammonia purge gases, enrichment of $O_2$ and $N_2$ from air, removal of acidic gases (e.g., $CO_2$ and $H_2H$) from natural gas, and dehydration of air and natural gas. However, most of the extant polymers show an inverse relationship between permeability and selectivity. In other words, a polymer having high selectivity exhibits low permeability and vice versa. Therefore, to overcome this trade-off, it is of great interest to develop new approaches generating membranes that offer both high permeability and high selectivity.

SUMMARY

Two potential high-performance (i.e., exhibiting both high permeability and high selectivity) membrane families are polymer blend membranes generated by mixing two or more polymers and carbon membranes generated by carbonizing polymeric membranes.

Accordingly, this invention relates to certain polymer blends and their carbonized form, as well as their use as gas separation/purification membranes.

In one aspect, this invention relates to a composition including a first polymer having monomers (or repeating structural unit) containing an imidazole group (i.e., one or more imidazole groups), and a second polymer. The first and second polymers are a miscible polymer blend, in which the first polymer, the second polymer, or both are cross linked. More specifically, the composition can be used as membrane material for separating and purifying gases.

In a further aspect, this invention relates to a polymeric membrane including a first polymer having monomers each containing an imidazole group, and a second polymer, the first and second polymers being a miscible polymer blend and the first polymer being more than 20% of the polymer blend by weight. The membrane has a thickness between 20 μm and 100 μm (e.g., between 30 and 50 μm), for example, when the membrane is in the form of a flat sheet. The membrane can have a gas selectivity greater than 15 (e.g., between 20 and 100, or between 25 and 100) for $H_2/CO_2$ separation.

In another aspect, this invention relates to a polymeric membrane in the form of a hollow fiber. The hollow fiber has a lumen and a polymeric membrane defining the lumen. The membrane includes a first polymer and a second polymer, the first and second polymers being a polymer blend (e.g., a miscible, partially miscible, or immiscible polymer blend).

Embodiments of the hollow fiber may include one or more of the following features. The first polymer is more than 1% (e.g., more than 20%) of the polymer blend by weight. The first polymer has monomers each containing an imidazole group. The hollow fiber has a wall thickness between 0.1 μm and 1000 μm. The polymer blend membrane has a thickness between 0.01 μm and 100 μm (e.g., between 0.1 μm and 1 μm). The hollow fiber further includes a porous tubular substrate, a circumferential surface (e.g., the outer surface) of which is in contact with a circumferential surface (e.g., the inner surface) of the polymeric membrane. The substrate is formed of a third polymer suitable for this invention, e.g., a polymer suitable for use under high pressures. The hollow fiber can further include an outmost coating e.g., a silicon rubber coating. The hollow fiber can be chemically-treated (e.g., cross-linked by a cross-linking agent), thermally-treated (e.g., carbonized or annealed without being carbonized), or both.

In still another aspect, this invention relates to a polymeric membrane prepared by a method that includes: forming a solution including a first polymer having monomers each containing an imidazole group, a second polymer miscible with the first polymer, and a solvent, casting the solution onto a substrate, and removing the solvent to obtain the membrane. The weight ratio of the first polymer to the second polymer is between 1:4 and 20:1 (e.g., between 1:3 and 20:1, or between 1:3 and 3:1) and the membrane has a thickness between 20 μm and 100 μm (e.g., between 30 μm and 50 μm).

Embodiments of the above-described composition, membrane, and hollow fiber may include one or more of the following features. The first polymer is a polybenzimidazole. The second polymer can be a polyimide, a polysulfone, a polyethersulfone, a polyarylate, polystyrene, a polyketone, a polyetherketone, or a polyamide-imide. The third polymer can be a polysulfone, a polyethersulfone, a polyarylate, a polyketone, a polyetherketone, a polyamide-imide, a polyimide, a polyamide, cellulose acetate, or a polybenzimidazole. The first, second, or third polymer can be cross linked by a cross-linking agent of the following formula:

In this formula, R is an aliphatic (e.g., alkylene such as n-propylene, alkenylene, or alkynylene) or aromatic group (e.g., arylene such as phenylene or heteroarylene), and each of X and Y, independently, is —$CH_2Cl$, —$CH_2Br$, —$CH_2I$, or —$CH_2NH_2$. In particular, p-xylene diamine or p-xylene dichloride is used as the cross-linking agent.

Examples of polybenzimidazoles include, but are not limited to, poly-2,2'-(1,3-phenylene)-5,5'-bibenzimidazole ("PBI"), poly-2,2'-(m-phenylene)-5,5'-bibenzimidazole, poly-2,2'-(pyridylene-3",5")-5,5'-bibenzimidazole, poly-2,2'-(furylene-2",5")-5,5'-bibenzimidazole, poly-2,2-(naphthalene-1",6")-5,5'-bibenzimidazole, poly-2,2'-(biphenylene-4",4")-5,5'-bibenzimidazole, poly-2,2'-amylene-5,5'-bibenzimidazole, poly-2,2'-octamethylene-5,5'-bibenzimidazole, poly-2,6-(m-phenylene)-diimidazobenzene, poly-2,2'-cyclohexenyl-5,5'-bibenzimidazole, poly-2,2'-(m-phenylene)-5,5'di (benzimidazole)ether, poly-2,2'-(m-phenylene)-5,5'-di (benzimidazole)sulfide, poly-2,2'-(m-phenylene)-5,5'-di (benzimidazole)sulfone, poly-2,2'-(m-phenylene)-5,5'-di (benzimidazole)methane, poly-2'-2''-(m-phenylene)-5',5''-(di(benzimidazole)propane-2,2, and poly-2',2''-(m-phenylene)-5',5''-di(benzimidazole)ethylene-1,2 where the double bonds of the ethylene are intact in the final polymer.

The term "polyimide" refers to both conventional and fluorinated polyimides. Examples of polyimides include, but are not limited to, Matirmid® 5218 (poly[3,3'4,4'-benzophenone tetracarboxylic dianhydride and 5(6)-amino-1-(4'-aminophenyl-1,3-trimethylindane)], or BTDA-DAPI), Torlon® 4000T, P84 (copolyimide of 3,3'4,4'-benzophenone tetracarboxylic dianhydride and 80% Methylphenylenediamine plus 20% methylenediamine), and polyimides containing hexafluoroisopropylidene (6FDA) groups, pyromellitic dianhydride (PMDA, Kapton), 1,4,5,8-Naphthalene tetracarboxylic dianhydride (NTDA), benzophenone tetracarboxylic dianhydride (BTDA), or 2,4,6,-trimethyl-1,3-phenylene diamine, 3,3',4,4'-biphenyltetracarboxylic dianhydride (BPDA). Other examples of polyimides are described in, e.g., S. M. Saufi et al., Carbon, 42 (2004) 241.

The term "alkylene" refers to a straight or branched bivalent hydrocarbon, containing 1-20 carbon atoms (e.g., $C_1$-$C_{10}$). Examples of alkylene include, but are not limited to, methylene and ethylene. The term "alkenylene" refers to a straight or branched bivalent hydrocarbon containing 2-20 carbon atoms (e.g., $C_2$-$C_{10}$) and one or more double bonds. Examples of alkenylene include, but are not limited to, ethenylene and propenylene. The term "alkynylene" refers to a straight or branched bivalent hydrocarbon containing 2-20 carbon atoms (e.g., $C_2$-$C_{10}$) and one or more triple bonds. Examples of alkynylene include, but are not limited to, ethynylene, 1-propynylene, and 1- and 2-butynylene. The term "arylene" refers to a bivalent 6-carbon monocyclic, 10-carbon bicyclic, 14-carbon tricyclic aromatic ring system. Examples of arylene groups include, but are not limited to, phenylene, naphthylene, and anthracenylene. The term "heteroarylene" refers to a bivalent aromatic 5-8 membered monocyclic, 8-12 membered bicyclic, or 11-14 membered tricyclic ring system having one or more heteroatoms (such as O, N, S, or Se).

Yet another aspect of this invention features a carbonized composition prepared by a method including: forming a solution that contains a first polymer whose monomer has an imidazole group, a second polymer miscible with the first polymer, and a solvent; casting the solution onto a substrate, removing the solvent to obtain a polymer blend precursor, and carbonizing the polymer blend precursor.

Further, this invention encompasses a carbon membrane prepared by a method including: forming a solution that contains a first polymer whose monomer has an imidazole group, a second polymer miscible with the first polymer, and a solvent, casting the solution onto a substrate, removing the solvent to obtain a transparent film, and carbonizing the transparent film.

In addition to certain applicable features described above, embodiments may also include one or more of the following features. The weight ratio of the first polymer to the second polymer is between 1:20 and 20:1 (e.g., between 1:9 and 9:1, or between 1:3 and 3:1). The polymer blend precursor or the transparent film has a thickness between 0.1 μm and 100 μm (e.g., between 0.1 μm and 1 μm, between 20 μm and 100 μm, or between 30 μm and 50 μm). The polymer blend precursor or the transparent film is cross-linked by a cross-linking agent before being carbonized. The carbonization can be pyrolysis of the polymer blend precursor or the transparent film under vacuum (e.g., 0.1 to 10 millibar, 0.2 to 5 millibar, or 0.5 to 2.5 millibar). The carbon membrane thus formed can have a gas selectivity of 4-9 (e.g., 6-9) for $N_2/CH_4$ separation, 100-250 (e.g., 150-250) for $CO_2/CH_4$ separation, and/or 15-40 (e.g., 25-40) for $H_2/CH_4$ separation.

Also within the scope of this invention is a method for separating a first fluid from a second fluid, e.g., separating a first gas from a second gas or a first liquid from a second liquid. The method can include passing a mixture having the first fluid (e.g., a first gas such as $H_2$, $O_2$, $CH_4$, and $N_2$) and second fluid (e.g., a second gas such as $CO_2$, $CH_4$, and $H_2S$) through a polymeric or carbon membrane (in the form of a sheet or hollow fiber) of this invention.

The details of one or more embodiments of the invention are set forth in the description below. Other features, objects, and advantages of the invention will be apparent from the following drawings, detailed description of several embodiments, and also from the appending claims.

DETAILED DESCRIPTION

This invention is based in part on the unexpected discovery that certain polymer blends and carbonized polymer blends of polybenzimidazoles have very high gas selectivity for gas pairs such as $H_2/CO_2$, $N_2/CH_4$, $CO_2/CH_4$, and $H_2/CH_4$.

Polymer blends are analogous to metal alloys, in which two or more polymers are blended together to create materials with desired properties. Polymer blends often consist of a matrix of one polymer containing another polymer as a dispersed or continuous phase. Polymer blending not only can alter the properties of constituent polymers to provide a synergistic effect to the resulting blend, but also can offer it some novel properties which are not found in the individual components. For membrane systems, blending of suitably selected polymers can offer several advantages, e.g., reconciling families of polymers with different separation properties or physiochemical characteristics, reducing production costs, and providing a simple and reproducible procedure.

Polymer blends are generally classified as miscible, partially miscible, or immiscible. Generally, miscibility is induced either by the similarity of the monomer units or by specific interactions between different segments. The compatibility of blend components is an important criterion in development of high performance membranes for gas separation, whose gas permeation properties are governed by the extent of physical or chemical similarity or by the specific interaction between polymers. On the contrary, in immiscible blends, the incompatible nature of polymers imposes other factors of consideration such as blend morphology and composition.

Figure 1:
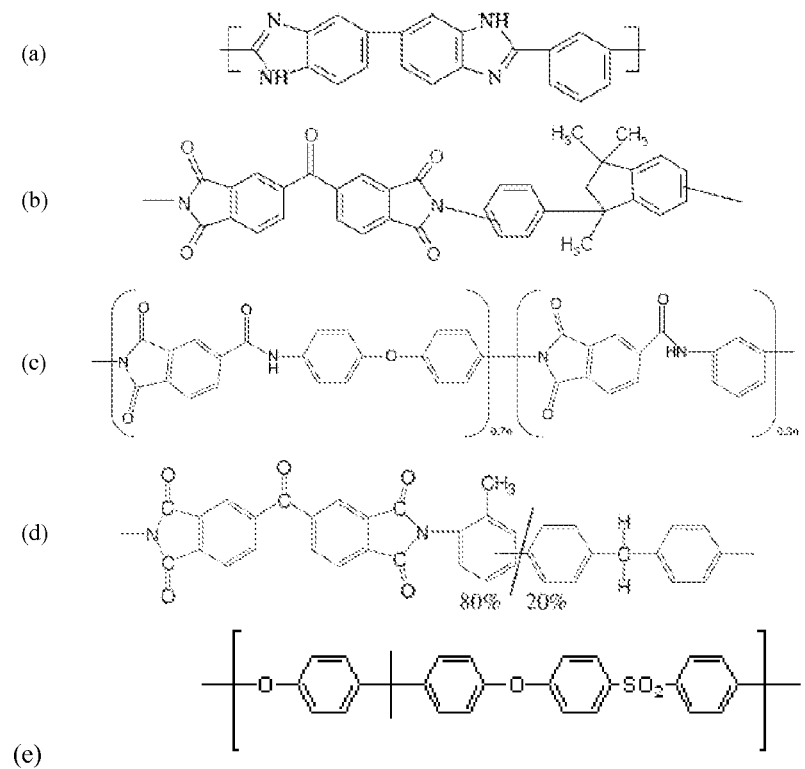
FIG. 1 shows the chemical structures of the repeating units of (a) poly-2,2'-(1,3-phenylene)-5,5'-bibenzimidazole ("PBI"), (b) Matrimid® 5218 ("Matrimid"), (c) Torlon® 4000T ("Torlon"), (d) P84, and (e) UDEL polysulfone ("PSf") respectively.

The miscible polymer blends of this invention can be prepared by combining two or more compatible polymers in various proportions, e.g., in all proportions. One of the components is a polymer having monomers each containing an imidazole group (i.e., one or more imidazole groups) such as a polybenzimidazole, more specifically, PBI or poly-2,2'-(1,3-phenylene)-5,5'-bibenzimidazole. PBI is a high performance polymer having a high glass transition temperature and outstanding thermal stability and chemical resistance. The outstanding thermal and chemical stability of PBI is beholden to the presence of benzimidazole heterocyclic moieties and absence of aliphatic groups in the chemical structure, as shown in FIG. 1(a). This also offers PBI good mechanical properties for operation at room temperature and even temperatures above 100° C. Nonetheless, its limited solubility in common solvents impedes wide application of the polymer. In addition, its extraordinary brittleness often encumbers the formation of a free-standing film from PBI solutions.

Figure 2:
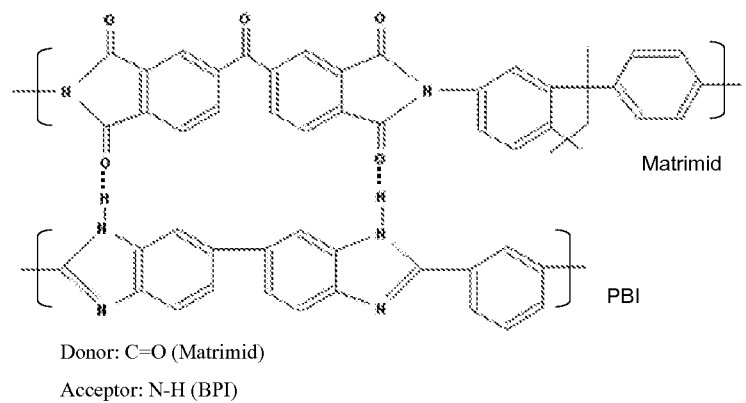
FIG. 2 is a schematic representation of the hydrogen bond interaction between functional groups of Matrimid and PBI.

Polyimides and PBI can be miscible over the entire ranges of compositions. The origin of this miscibility has been ascribed to hydrogen bond interaction between the imidazole hydrogen and the carbonyl group of polyimide, as illustrated in FIG. 2. Thus, the other polymer in the polymer blend of this invention can be selected from a variety of polyimide families including conventional and fluorinated ones in which different dianhydride and diamine moieties are used as monomers. Examples include Matrimid® 5218 (poly [3,3'4,4'-benzophenone tetracarboxylic dianhydride and 5(6)-amino-1-(4'-aminophenyl-1,3-trimethylindane)], BTDA-DAPI), Torlon® 4000T, and P84 (copolyimide of 3,3'4,4'-benzophenone tetracarboxylic dianhydride and 80% methylphenylenediamine and 20% methylenediamine). FIGS. 1(b)-(d) show the chemical structures of their monomers, respectively. Similar to PBI, Matrimid® 5218 ("Matrimid") is a thermally stable polymer with excellent mechanical properties and fairly good correlation between gas permeability and selectivity. One benefit of blending PBI and Matrimid is that this approach provides the capability of exploiting the promising properties of PBI in conjunction with Matrimid for gas separation applications. This would otherwise not be possible due to the highly brittleness of pure PBI membranes.

A simple solution casting approach is employed to fabricate membranes in a dense flat configuration. In embodiments, polymer solutions containing 2 wt % polymers are prepared by dissolving desired ratios of Matrimid and PBI in a solvent such as N-methyl-2-pyrrolidone ("NMP"). First, PBI with a stipulated quantity is dissolved in the solvent (e.g., NMP) at an elevated temperature lower than the boiling point of the solvent (e.g., 120-180° C.) using a magnetic stirrer. It can take a few days to complete the dissolving process. The resulting PBI solution is then filtered, e.g., using a 2 μm filter, to eliminate any undissolved polymer and unwanted particulate matter. Next, Matrimid powders are added in the solution and stirring is continued for a few days to allow the complete mixing of blend constituents. After degassing, the polymer blend solution is poured onto a silicon wafer surrounded by a metal ring. The wafer is then placed in a vacuum oven. The oven temperature is set at temperatures high enough (e.g., 80-120° C.) to provide slow evaporation of the solvent. This evaporation process can be continued for about five days. Afterwards, the temperature of the oven is gradually increased to a temperature higher than the boiling point of the solvent (e.g., 200-300° C.) and the membrane thus formed is kept at the final temperature for a period of time to assure complete solvent removal. The as-cast membrane is collected after natural cooling. A more detailed preparation procedure is described in Hosseini et al., *Polymer*, 49 (2008) 1594. Other techniques have been used to fabricate polymer blend membranes in the form of a single-layer hollow fiber. See Chung et al., *J. Membr. Sci.*, 147 (1998) 35; Kapantaidakis et al., *J. Membr. Sci.*, 204 (2002) 153; and Kapantaidakis et al., *Desal.*, 144 (2002) 121.

The hollow fiber formed of the polymer blend membrane can have a multi-layer (e.g., dual-layer) structure. In embodiments, the hollow fiber includes a layer of a polymer blend and a porous tubular substrate in contact with the polymer blend layer. The polymer blend layer can either be an outer layer (i.e., sheathing the tubular substrate) or an inner layer (i.e., sheathed by the tubular substrate) of the hollow fiber. The substrate provides reliable mechanical support to the polymer blend layer.

Figure 15:
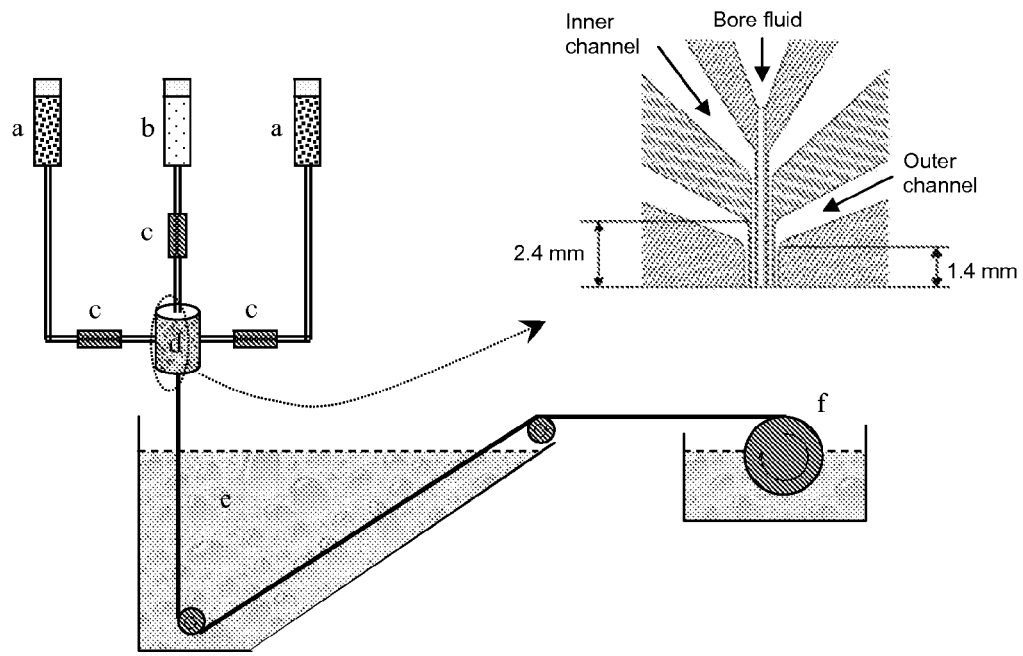
FIG. 15 is a sectional view of a spinning set-up with a triple-orifice spinneret for producing a dual-layer hollow fiber. In this figure, "a" refers to a tank for a dope fluid and the pump connected thereto, "b" refers to a tank for a bore fluid and the pump connected thereto, "c" refers to a filter, "d" refers to a spinneret, "e" refers to a coagulation bath, and "f" refers to a take-up drum.

The dual-layer hollow fibers described herein can be produced by co-extrusion of polymeric materials, e.g., via a dry jet wet spinning process (in which an air gap exists between the tip of the spinneret and the coagulation bath) or a wet spinning process (with zero air-gap distance). FIG. 15 is a sectional schematic of a dry jet wet spinning set-up with a triple-orifice spinneret for producing a dual-layer hollow fiber. As shown in this figure, three high precisions syringe pumps (i.e., a and b) are employed to co-extrude dope solutions and the bore fluid through the spinneret at specified flow rates. All solutions are filtered before entering specific channels of the spinneret (i.e., d). Nascent hollow fibers are then passed through the coagulation bath (i.e., e) and then are collected around a rotating drum (i.e., f). This drum is equipped with various gears to adjust take-up speeds. Various parameters can be selected to control morphologies and properties (e.g., gas transport properties) of the hollow fibers, such as dope formulation, dope viscosity, dope flow rate, air-gap distance, and take-up speed. For example, by selecting compatible polymeric materials for each of the two layers, delamination at the interfacial region where two layers meet can be avoided. As used herein, the term "dope" refers to a solution/suspension containing the polymer(s) to be used in the polymer blend or the substrate layer.

In general, a blend or blend membrane formed from miscible polymers is clear and transparent in appearance. Also indicative of miscibility is the presence of composition-dependent single glass transition temperatures ("Tg") that all fall in the midst of each individual components' Tg values. The glass transition temperature of blends can be calculated theoretically by using the Fox equation expressed as follows:

$$\frac{1}{T_g} = \frac{W_1}{T_{g_1}} + \frac{W_2}{T_{g_2}}. \quad (1)$$

In this equation, $T_{g_1}$ and $T_{g_2}$ are glass transition temperatures (K) of individual polymers, $T_g$ is the glass transition temperature of the blend of the two polymers, and $W_1$ and $W_2$ are mass fractions of each component in the blend.

Additionally or alternatively, tailoring properties of polymeric materials can be achieved by chemical modification (e.g., polymer cross linking) In order to cross link a polymer, the polymer has to possess at least a functional group (e.g., an amino, carboxylic, or a hydroxyl group) to make the polymer capable of undergoing modification. Similarly, the appropriate cross-linking agents must also contain suitable functional groups. In addition, the backbone of the cross-linking agents can be either aliphatic or aromatic and it may contain side groups. Besides the chemical structures of the cross-linking agents and starting polymers, other parameters relevant to controlling the properties of a cross-linked polymer include concentrations of the agents/polymers, the reaction rate, reaction medium, and reaction temperature. For the preparation of gas separation membranes, it is preferred to preserve the rigidity of the starting polymers at a suitable range. Therefore, it is preferred that the cross-linking agents have a bulky aromatic group. One benefit of cross-linking polymer chains is that it offers a special integrity and structural stability which protects the membrane from $CO_2$ induced swelling and plasticization.

In embodiments, cross linking is carried out after the polymer blend or blend membrane is obtained. A simple dipping method can be applied for cross linking the blend or the blend membranes. In one embodiment, a solution having 10 wt. % p-xylene diamine in methanol is prepared to cross-link the polyimide component of the blend. On the other hand, a solution having 2 wt. % p-xylene dichloride in methanol is used to cross link PBI phase. The blend or blend membrane is immersed in either or both the solutions for stipulated periods of 5 and 10 days. Then it is immersed in fresh methanol to rinse off unreacted molecules followed by drying the blend or blend membrane in a vacuum oven at 120° C. for overnight.

Carbon membranes (in a form of either a sheet or a hollow fiber) of the invention are formed through pyrolysis of polymeric precursors (e.g., a polymer blend). Their porous structure allows for high permeability (high productivity) while their molecular sieving network provides the efficient size and shape discrimination of molecules (high selectivity). In addition, carbon membranes also have very good chemical and thermal stability. Chemical properties and microstructure of the polymeric precursor as well as the pyrolysis process parameters are among the key factors governing the transport properties in carbon membranes. Typically, the polymeric precursors for carbon membranes need to be chemically and thermally stable as well as be able to retain the macromolecular structures and network integrity during the pyrolysis process. As described above, PBI/Matrimid blends have excellent chemical and thermal stability and thus can be used as precursors for carbon membranes.

Figure 3:
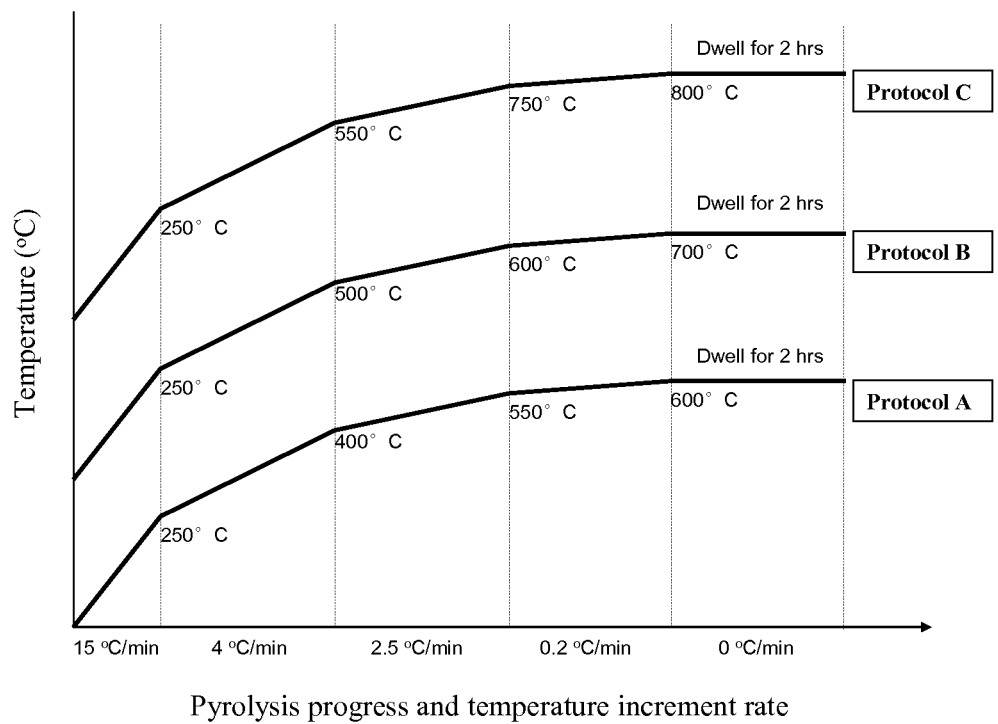
FIG. 3 is schematic diagram demonstrating three carbonization protocols with distinct final temperatures (600° C. in protocol A, 700° C. in protocol B, and 800° C. in protocol C).

Special pyrolysis conditions are selected to obtain the carbon membranes with desirable properties. The pyrolysis process can be performed in a vacuum furnace or any other heating oven equipped with pumping devices to generate vacuum for the process. The polymeric precursors can be carbonized under various vacuum conditions, preferably at very low pressure, e.g., below 5 millibar. Any suitable supporting means for holding the membrane precursor and the resulting carbon membrane can be used during the pyrolysis process. For example, the polymer blend precursor can be sandwiched between two metallic wire meshes. Various pyrolysis protocols can be used, but selection of a proper pyrolysis protocol can greatly influence the properties of the carbon membranes obtained. In embodiments, three different protocols are used. As illustrated in FIG. 3, three temperatures, 600° C., 700° C. and 800° C., are set as final pyrolysis temperatures in protocols A, B, and C, respectively. The heating rates are controlled by a ramp function of the oven, starting at 15° C./min, with consecutively lower rates of 4° C./min, 2.5° C./min and finally 0.2° C./min. The dwelling time at final temperature is 2 hrs for all protocols. At the end of the process, the membranes are cooled down steadily to room temperature by, e.g., turning off the heat.

The gas permeation properties of the membranes of this invention can be determined by a variable-pressure constant-volume method. Detailed experimental design and procedures can be found in Lin et al., *J. Polym. Sci.: Polym. Phys.*, 38 (2000) 2703. The rate of pressure increase (dp/dt) at steady state is used for the calculation of gas permeability with the following relationship:

$$P = \frac{273.15 \times 10^{10} Vl}{760\,AT((P_0 \times 76)/14.7)} \left(\frac{dp}{dt}\right). \quad (2)$$

In equation (2), P is the gas permeability of a membrane in Barrer (1 Barrer=$1\times10^{-10}$ cm$^3$ (STP)-cm/cm$^2$·sec·cmHg), V is the volume of the down-stream chamber (cm$^3$), A refers to effective area of the membrane (cm$^2$), l is the membrane thickness (cm), T is the operating temperature (K), and the feed gas pressure in the up-stream is given by $P_0$ in psia.

The ideal selectivity of a membrane for gas A over gas B was evaluated as follows:

$$\alpha_{A/B} = \frac{P_A}{P_B}. \quad (3)$$

In equation (3), $P_A$ and $P_B$ are the gas A permeability and gas B permeability of the membrane, respectively.

The gas selectivity (or separation factor) of a membrane for a mixed gas is characterized by the following equation:

$$\alpha_{A/B} = \frac{y_A/y_B}{x_A/x_B}. \quad (4)$$

In equation (4), $y_A$ and $y_B$ are the downstream mole fraction of gas A and gas B, respectively, and $x_A$ and $x_B$ are the upstream mole fraction of gas A and gas B, respectively.

The permeance of a hollow fiber, P/L, can be determined using the following equation:

$$\frac{P}{L} = \frac{Q}{A\Delta p} = \frac{Q}{n\pi D l \Delta p}. \quad (5)$$

In equation (5), P is the permeability of a membrane, L is the thickness (Barr) of the membrane (cm), Q is the pure gas flux (cm$^3$·s$^{-1}$), n specifies the number of fibers in the testing module, D is the outer diameter of the fiber (cm), l is the effective length of the fiber (cm), and Δp is the gas pressure difference across the membrane (cm Hg). The unit of calculated permeance is GPU (1 GPU=$1\times10^6$ cm$^3$ (STP)/cm$^2$·s·cmHg).

Without further elaboration, it is believed that the above description has adequately enabled the present invention. The following examples are, therefore, to be construed as merely illustrative, and not limitative of the remainder of the disclosure in any way whatsoever. All of the publications cited herein are hereby incorporated by reference in their entirety.

EXAMPLE 1

Matrimid Membrane Preparation and Permeability Test

A dense film was prepared from the commercially available Matrimid® 5218 polyimide. The casting process was carried out at room temperature from a 2 wt % Matrimid NMP solution. The Matrimid film was formed after most of the solvent had evaporated slowly. The nascent film was dried in a vacuum at 200° C. overnight to remove any traces of residual solvent. The gas permeability and ideal selectivity of the Matrimid dense film were determined according to equations (2) and (3). The results are summarized in Table 1 below. The pure gas permeability was obtained in a sequence of $H_2$, $N_2$, $CH_4$ and $CO_2$ at 35° C. The $H_2$ permeability test was conducted at 3.5 atm, while the testing pressure for other gases was 10 atm.

TABLE 1

Gas separation properties of Matrimid dense flat membranes

| Membrane constituents | Permeability (Barrer) | | | | Ideal Selectivity | | |
|---|---|---|---|---|---|---|---|
| | $H_2$ | $N_2$ | $CH_4$ | $CO_2$ | $H_2/N_2$ | $H_2/CO_2$ | $CO_2/CH_4$ |
| Matrimid® 5218 | 27.16 | 0.280 | 0.210 | 7.00 | 97.00 | 3.88 | 33.33 |

EXAMPLE 2

Matrimid/PBI Blend Membrane Preparation and Miscibility Test

Matrimid/PBI blend dense flat membranes were prepared in three different compositions: 25/75, 50/50, and 75/25 wt %. The membranes were prepared according to the method described supra or in Hosseini et al., *Polymer*, 49 (2008) 1594. All of the films prepared from the blends of Matrimid and PBI were transparent and homogenous. No symptom of phase separation was detected by visual observation. The appearance of the clear films indicates miscibility of the as-cast membranes. The miscibility of as-cast membranes was also examined for the three compositions with Tg measurement, calorimetry thermograms. Table 2 below presents the results.

TABLE 2

Glass transition temperature of blends with different compositions and comparison with predicted values from the Fox equation

| Blend and Composition | Experimental Tg (° C.) | Theoretical Tg (° C.) |
|---|---|---|
| Matrimid | 323.1 | 323.1 |
| Matrimid/PBI (75/25 wt %) | 338.3 | 347.5 |
| Matrimid/PBI (50/50 wt %) | 375.2 | 374.2 |
| Matrimid/PBI (25/75 wt %) | 390.4 | 403.2 |
| PBI | 435.0 | 435.0 |

The results shown in Table 2 also confirm the miscibility of blends by showing the presence of composition dependent single Tg that all fall in the midst of each individual components' Tg values. In addition, a positive shift in Tg was observed with an increase in PBI composition due to the higher Tg of PBI.

Figure 4:
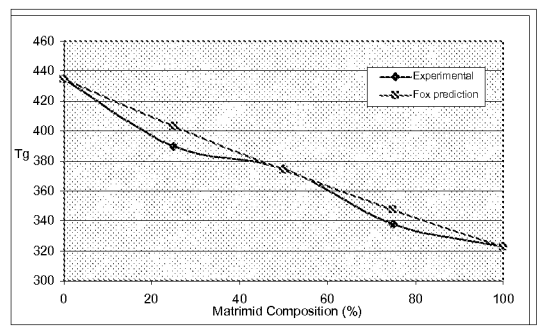
FIG. 4 is a plot of glass transition temperature ("Tg") of the PBI/Matrimid blend vs. Matrimid content of the blend.

The Tg-composition curve of the blend system is shown in FIG. 4. The comparison of experimental and theoretical results indicates that the Fox equation can successfully predict the Tg values at equal compositions (i.e., 50/50 wt. %). However, negative deviation from the theoretical Tg values is observed for the other compositions. Deviation from the theoretical results is a common phenomenon in most of the polymer blends and is generally a reflection of specific interactions between the components. Indeed, the nature of miscibility of Matrimid/PBI is the strong hydrogen bonds between the N—H groups of PBI and the C=O groups of Matrimid which leads to intermolecular compatibility. The schematic representation of this interaction is shown with dashed lines in FIG. 2.

EXAMPLE 3

Matrimid/PBI Blend Membrane Permeability Test

The gas permeability and ideal selectivity of the blend membranes prepared in Example 2 were determined according to the method described in Example 1. Table 3 below tabulates the results.

TABLE 3

The permeability and ideal gas selectivity of polymer blend membranes with various compositions

| Membrane constituents | Permeability (Barrer) | | | | Ideal Selectivity | | |
|---|---|---|---|---|---|---|---|
| | $H_2$ | $N_2$ | $CH_4$ | $CO_2$ | $H_2/N_2$ | $H_2/CO_2$ | $CO_2/CH_4$ |
| Matrimid/PBI (75/25% wt %) | 19.72 | 0.163 | 0.130 | 4.19 | 120.98 | 4.07 | 32.23 |
| Matrimid/PBI (50/50% wt %) | 13.06 | 0.072 | 0.045 | 2.16 | 181.38 | 6.05 | 48.00 |
| Matrimid/PBI (25/75% wt %) | 5.47 | 0.021 | 0.0097 | 0.58 | 260.47 | 9.43 | 59.79 |

The results denote a general decline in gas permeability with an increase in PBI concentration for all of the gases tested. It was also observed that the extent of the decrease in gas permeability of the membranes is commensurate with the kinetic diameter of the gas molecules. In other words, gases with a larger kinetic diameter experienced a higher degree of diminution in permeability with the increase of PBI content. The instrumental consequence of this behavior was the melioration in gas selectivity of selected gas pairs. For example, data in Table 3 show that the selectivity of $H_2/CO_2$ and $H_2/N_2$ increased by about 1.5 fold to reach about 9.43 and 260.47, respectively. Unexpectedly, a quite similar improving trend was observed in the selectivity of $CO_2/CH_4$. There is only a small difference in the sizes of the two molecules, and yet the ideal selectivity of this gas pair reached about 60.

The gas selectivity of a membrane for a gas pair is the ratio of their individual permeability coefficients, while the gas permeability (P) is a product of solubility (S) and diffusivity (D) coefficients which are highly dependent on the nature of the penetrant and the membrane material. The S and D coefficients jointly control the overall permeability of a membrane. The interrelation between the size of gas molecules and changes in permeability as well as the presence of the hydrogen bond interaction between the components fortify the idea that the possible reason for changes in transport properties of membranes might have been the effect of PBI on membranes' morphology on the molecular level.

EXAMPLE 4

Free Volume Analysis of PBI Effect on Membranes' Morphology

It is well documented that free volume is a determining factor in gas transport properties of a membrane.

The fractional free volume (FFV) calculations were based on the following equations:

$$FFV = \frac{V_{sp} - V_0}{V_{sp}} \quad (6)$$

$$V_0 = 1.3 V_W \quad (7)$$

$$V_{sp} = 1/\rho \quad (8)$$

In the above equations, Vsp is the specific volume of a polymer film ($cm^3/g$), $\rho$ represents the density ($g/cm^3$) of the polymer film which is measured experimentally, and $V_0$ is the volume occupied by the chains ($cm^3/g$). The values of Van der Waals volumes ($V_W$) for individual polymers were obtained by applying group contribution method described in Van Krevelen, *Properties of Polymers—Their Correlation with Chemical Structure; Their Numerical Estimation and Prediction from Additive Group Contributions*, Elsevier, Amsterdam, 1990. According to Bondi, *Physical Properties of Molecular Crystals, Liquids, and Glasses*, Wiley, New York, 1968, equation (7) provides a good approximation for the evaluation of $V_0$ based on the Van der Waals volume. The corresponding $V_W$ and molecular weight M of blends were calculated using the mixing rules.

The free volume analysis was performed in order to investigate the effect of incorporation of PBI on microstructure and how the strong interaction between blend components can alter the transport properties of membranes. The results of measurements and calculations are shown in Table 4. The mixing rule was employed for the calculation of the corresponding values of $V_W$ and M for blend membranes.

TABLE 4

Effect of blend composition on the physical properties and fraction of free volume of membranes

| Membrane constituents | M (g/mol) | $\rho$ (g/cm$^3$) | Vw (cm$^3$/mol) | $V_0$ (cm$^3$/g) | $V_{sp}$ (cm$^3$/g) | FFV |
|---|---|---|---|---|---|---|
| Matrimid ® 5218 | 568.6 | 1.172 | 273.1 | 0.624 | 0.853 | 0.268 |
| Matrimid/PBI (75/25% wt %) | 469.5 | 1.192 | 229.9 | 0.637 | 0.839 | 0.241 |
| Matrimid/PBI (50/50% wt %) | 399.6 | 1.244 | 199.6 | 0.649 | 0.804 | 0.193 |
| Matrimid/PBI (25/75% wt %) | 347.9 | 1.274 | 177.1 | 0.662 | 0.785 | 0.157 |
| PBI | 308 | 1.311 | 159.8 | 0.674 | 0.763 | 0.116 |

Data in Table 4 indicate that Matrimid and PBI possess the maximum (0.268) and the minimum (0.116) fractional free volumes, respectively. The difference in FFV of these materials possibly stems from the difference in chemical structure. It can be seen from FIG. 2 that Matrimid and PBI are quite similar in structure of backbone and repeating unit. However, it is speculated that the presence of the side oxygen groups as well as large methyl groups in the structure of Matrimid does not allow the polymer chains to come as close as possible.

EXAMPLE 5

Molecular Structures of PBI and Matrimid by Molecular Simulation

Figure 5:
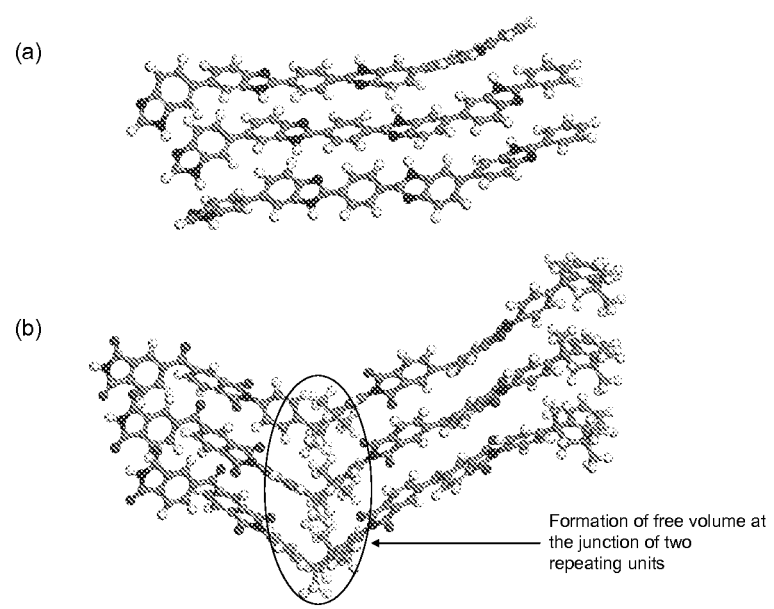
FIGS. 5(a) and 5(b) are molecular structures of PBI and Matrimid, respectively, using molecular simulation.

Application of molecular simulation study on the configuration and conformations of polymer chains corroborated our hypothesis in Example 4. As presented in FIGS. 5(a) and 5(b), clearly a better chain packing can be observed between the PBI macromolecules. In contrast to PBI, there exists a relatively large free volume formed in the structure of Matrimid which is mainly in the junction of two repeating units where bulky methyl groups provide spatial hindrance against good chain packing. The intensity of this hindrance is large enough to result in the conformational rotation of the chain at the junction of repeating units in the structure of Matrimid.

Therefore, in consistence with data in Table 4, the FFV of membranes films undergoes a stepwise decline by an increase in PBI composition. In addition this, the generation of strong hydrogen bonds between blend components which is not present in individual polymers may also contribute to the diminishment of FFV by keeping the distinct polymer chains in the minimum interstitial distance. The hydrogen bond also restrains the polymer chain from freely rotating and moving. The augmentation of glass transition temperature by the increase in PBI content is a sign of enhancing chain stiffness. The proportional relationship between the measured density and the PBI content in the blend membrane is another evidence of congestion of polymer chains in structure of polymer blends which provides a larger chain packing density.

EXAMPLE 6

Cross Linking Matrimid/PBI Blend

Figure 6:
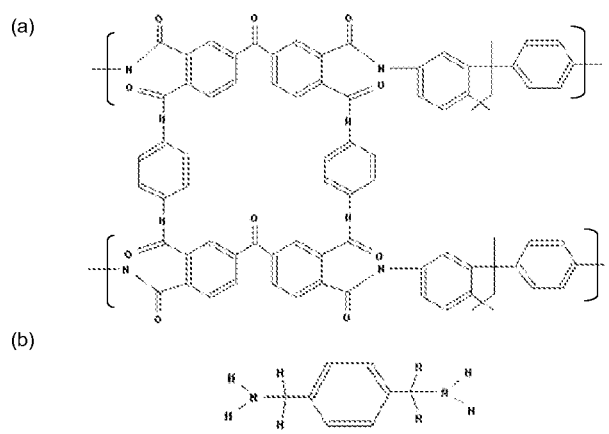
FIG. 6(a) is schematic diagram illustrating a proposed mechanism for cross-linking Matrimid component of the PBI/Matrimid blend with p-xylene diamine and FIG. 6(b) shows the chemical structure of p-xylene diamine.
Figure 7:
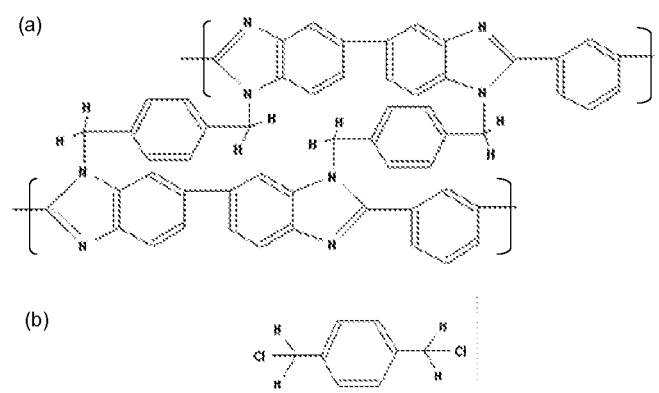
FIG. 7(a) is schematic diagram illustrating a proposed mechanism for cross-linking PBI component of the PBI/Matrimid blend with p-xylene dichloride and FIG. 7(b) shows the chemical structure of p-xylene dichloride.

The presence of five carboxyl group in the repeating unit of Matrimid and two N—H groups in the repeating unit of PBI allows these polymers to be chemically modified. Matrimid/PBI blend membranes with a composition of (25/75 wt %) which exhibited the superior performance were chemically modified using two different cross-linking agents. The chemical structure of agents and proposed mechanisms for cross linking process are shown in FIGS. 6 and 7. According to the two Figures, in the course of cross linking, p-xylene dichloride molecules attack the N—H groups of PBI and p-xylene diamine molecules react with the amide groups of Matrimid. It is likely that the cross linking reaction started from the outermost surface of membranes. In the meantime, swelling of membranes structure by the carrier of the cross-linking agent (e.g., methanol) provided the opportunity for the cross-linking agents to penetrate into the membranes and access the functional groups of polymers inside the membranes. The extent of cross-linking the inner polymers of the membranes was expected to decline as the surface modification seemed to impede further inward penetration of agents.

EXAMPLE 7

Cross-Linked Matrimid/PBI Blend Membrane Permeability Test

Gas permeability and ideal gas selectivity results of the modified membranes prepared in Example 6 are presented in Tables 5 and 6 below. As indicated by the data shown in these Tables, chemical modification affected the gas permeability of the membranes and a gradual decline in gas permeability was resulted by prolonging the immersion time in the cross-linking agents. The extent of reduction in permeability follows a trend of dependence on the sizes of gas molecules similar to that observed in Example 3. Consequently, this characteristic phenomenon resulted in variation in selectivity performance of the membranes. According to Table 5, slight improvements were achieved in the selectivity of $H_2/N_2$ and $H_2/CO_2$ after cross-linking of PBI, but the selectivity of $CO_2/CH_4$ underwent a dramatic deterioration. On the other hand, the permeation results of modified Matrimid phase revealed a similar declining trend in permeation behaviour, as shown in Table 6. However, a comparison of the results in Tables 5 and 6 for corresponding chemically modified membranes revealed that permeability of the membranes treated with p-xylene diamine underwent more noticeable changes. This implies that p-xylene diamine has spelled greater effect on the transport properties of the blend membranes. Indeed, as shown in Table 6, the $H_2/CO_2$ selectivity of the treated membrane reached about 26 after 10 days treatment with p-xylene diamine, which is considerably higher than that of other blend samples and corresponding individual components.

TABLE 5

The effect of chemical modification using p-xylene dichloride on gas permeability and selectivity of blend membranes

| Membrane constituents | Permeability (Barrer) | | | | Ideal Selectivity | | |
|---|---|---|---|---|---|---|---|
| | $H_2$ | $N_2$ | $CH_4$ | $CO_2$ | $H_2/N_2$ | $H_2/CO_2$ | $CO_2/CH_4$ |
| Matrimid ® 5218 | 27.16 | 0.280 | 0.210 | 7.00 | 97.00 | 3.88 | 33.33 |
| Matrimid/PBI (25/75 wt %) | 5.47 | 0.021 | 0.0097 | 0.580 | 260.47 | 9.43 | 59.79 |
| Matrimid/PBI (25/75) duration = 5 days | 5.34 | 0.019 | 0.0175 | 0.453 | 281.05 | 11.79 | 31.03 |
| Matrimid/PBI (25/75) duration = 10 days | 4.04 | 0.014 | 0.0158 | 0.306 | 288.57 | 13.02 | 19.36 |

TABLE 6

The effect of chemical modification using p-xylene diamine on gas permeability and selectivity of blend membranes

| Membrane constituents | Permeability (Barrer) | | | | Ideal Selectivity | | |
|---|---|---|---|---|---|---|---|
| | $H_2$ | $N_2$ | $CH_4$ | $CO_2$ | $H_2/N_2$ | $H_2/CO_2$ | $CO_2/CH_4$ |
| Matrimid ® 5218 | 27.16 | 0.280 | 0.210 | 7.00 | 97.00 | 3.88 | 33.33 |
| Matrimid/PBI (25/75 wt %) | 5.47 | 0.021 | 0.0097 | 0.580 | 260.47 | 9.43 | 59.79 |
| Matrimid/PBI (25/75) duration = 5 days | 4.09 | 0.0152 | 0.0046 | 0.209 | 269.1 | 19.56 | 45.43 |
| Matrimid/PBI (25/75) duration = 10 days | 3.60 | 0.0132 | 0.0031 | 0.138 | 271.2 | 26.09 | 44.51 |

Stronger influence of cross-linking with p-xylene diamine compared to p-xylene dichloride might be due to the difference in concentration of the cross-linking agents in the solution. This could also be ascribed to the difference in activity of the functional groups of constituent polymers towards corresponding cross-linking agents. In such a case, the results shown in the tables may indicate that the cross-linking efficiency of Matrimid is considerably much higher than that of PBI.

EXAMPLE 8

Matrimid, Torlon, or P84 Membrane Preparation and Permeability Test

Dense films were prepared from Matrimid, Torlon, and P84 to examine their gas separation performance. The casting process was carried out at room temperature from a 2 wt % polymer NMP solution. The polymer films were formed after most of the solvent had evaporated slowly. The nascent films were dried in vacuum at 200° C. overnight to remove any traces of residual solvent. The gas permeability and ideal selectivity of dense films obtained from Matrimid, Torlon and P84 were obtained according to the method described in Example 1. The results are summarized in Table 7 below.

single Tg that all fall in the midst of each individual components' Tg values. The nature of miscibility of PBI and polyimides is believed to be the strong hydrogen bonds between the N—H groups of PBI and the C=O groups of the polyimides which leads to intermolecular compatibility. For example, the schematics of this hydrogen bond interaction between PBI and Matrimid is illustrated in FIG. 2.

TABLE 7

Gas permeability and ideal selectivity of Matrimid, Torlon, and P84

| Membrane material | Permeability (Barrer) | | | | | | Ideal Selectivity | | | | |
|---|---|---|---|---|---|---|---|---|---|---|---|
| | He | $H_2$ | $O_2$ | $N_2$ | $CH_4$ | $CO_2$ | $H_2/N_2$ | $N_2/CH_4$ | $CO_2/CH_4$ | $O_2/N_2$ | $H_2/CO_2$ |
| Matrimid | 26.06 | 27.16 | 2.00 | 0.280 | 0.210 | 7.00 | 97.0 | 1.33 | 33.33 | 7.14 | 3.88 |
| Torlon | 5.53 | 4.44 | 0.212 | 0.037 | 0.030 | 0.83 | 120.0 | 1.23 | 27.80 | 5.73 | 5.32 |
| P84 | 11.29 | 9.09 | 0.402 | 0.050 | 0.028 | 1.37 | 181.8 | 1.78 | 48.93 | 8.04 | 6.63 |

EXAMPLE 9

Dense flat blend membranes were prepared from PBI and three polyimides ("PI") including Matrimid, Torlon, and P84 at a 50/50 wt % concentration ratio. The membranes were prepared according to the method described in Example 2. All of the films prepared from the PBI/PI blends were transparent and homogenous. No symptom of phase separation was detected by visual observation. The appearance of the clear films indicates miscibility of the as-cast membranes. The miscibility of as-cast membranes was also examined for the three blends with Tg measurement, i.e., the differential scanning calorimetry. Table 8 below presents the results.

TABLE 8

The glass transition temperature of polymers and blends measured by differential scanning calorimetry (DSC)

| Polymer | $T_g$ (° C.) |
|---|---|
| PBI | 417.5 |
| Matrimid | 323.1 |
| Torlon | 274.7 |
| P84 | 315.0 |

| Blends and composition | $T_g$ (° C.) |
|---|---|
| PBI/Matrimid (50/50 wt. %) | 375.2 |
| PBI/Torlon (50/50 wt. %) | 355.2 |
| PBI/P84 (50/50 wt. %) | 390.1 |

The results shown in Table 2 also confirm the miscibility of blends by showing the presence of composition dependent

EXAMPLE 10

Blend Membrane Permeability Test

The gas permeability and ideal selectivity of the blend membranes prepared in Example 9 were determined according to the method described in Example 1. Table 9 below tabulates the results.

TABLE 9

The permeability and ideal gas selectivity of polymer blend membranes obtained from PBI and various polyimides

| Membrane material & composition | Permeability (Barrer) | | | | | | Ideal Selectivity | | | | |
|---|---|---|---|---|---|---|---|---|---|---|---|
| | He | $H_2$ | $O_2$ | $N_2$ | $CH_4$ | $CO_2$ | $H_2/N_2$ | $N_2/CH_4$ | $CO_2/CH_4$ | $O_2/N_2$ | $H_2/CO_2$ |
| PBI/Matrimid (50/50 wt. %) | 13.55 | 13.06 | 0.58 | 0.072 | 0.045 | 2.16 | 181.38 | 1.6 | 48.00 | 8.05 | 6.05 |
| PBI/Torlon (50/50 wt. %) | 4.38 | 3.75 | 0.151 | 0.023 | 0.021 | 0.615 | 163.04 | 1.1 | 29.28 | 6.57 | 6.10 |
| PBI/P84 (50/50 wt. %) | 7.52 | 6.88 | 0.389 | 0.067 | 0.056 | 1.60 | 102.68 | 1.2 | 28.61 | 5.81 | 4.30 |

The results denote that incorporation of PBI macromolecules, which consist of rigid aromatic chains, brought a diminishing effect on the permeation properties of the membranes. The influences caused by blending are different for each pair, which possibly reflects the nature and intensity of the interactions involved. The greatest effect could be observed for PBI/Matrimid blend in which the permeability dropped, on average, to about half of the original value in Matrimid film. This is possibly owing to the strong hydrogen bonds between the functional groups of PBI and Matrimid. In comparison, a less reduction in permeability was observed for the other two blends. No definite trend could be established for variations in gas selectivity.

EXAMPLE 11

Carbonized Blend Membrane Permeability Test

Figure 8:
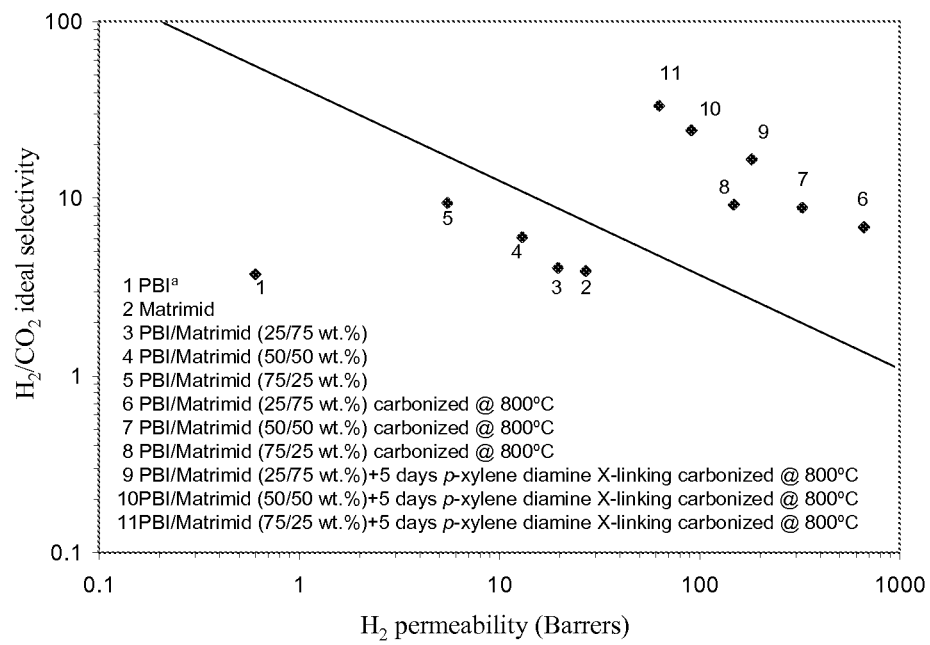
FIG. 8 is schematic diagram illustrating performance of PBI/Matrimid blends with various PBI/Matrimid weight ratios and of their corresponding carbon membranes for $H_2/CO_2$ separation with respect to a trade-off line. The superscript "a" indicates that the data for point 1 is from Kumbharkar et al., J. Membr. Sci., 286 (2006) 161 ("Kumbharkar"). The trade-off line was drawn based on data from Robeson et al., Polymer, 35 (1994) 4970.

The gas permeability and selectivity of carbon molecular sieve membranes derived from blend precursors in Example 9 are presented in Table 10 below. As could be expected from the nature of carbon membranes, the tested carbon membranes exhibited much larger permeability compared to their corresponding precursors. Unexpectedly, gas permeability of carbon membranes followed an opposite trend compared to that observed in the blend precursors. For instance, polymeric membrane made from PBI/Torlon (50/50 wt. %) offered the lowest gas permeability among the three blend precursors while its carbonized form exhibited the highest permeability. On the other hand, gas selectivities in almost all cases were raised to some extent, depending on the type of the gas pair. Unexpectedly, compared to other blended carbon membranes, the one derived from PBI/Matrimid (50/50 wt. %) possessed the highest selectivity for the majority of the gas pairs including $H_2/N_2$, $N_2/CH_4$, $CO_2/CH_4$, and $H_2/CO_2$. The $O_2/N_2$ selectivity of this membrane was comparable and slightly lower than that of carbonized PBI/Torlon (50/50 wt. %).

text) and the pore formation during the carbonization process. This might be in conjunction with the fact that compared to Matrimid, less non-carbon elements are present in the repeating unit of PBI which can assist in retaining the membrane's original stability during carbonization process. As a result, the formation of a fine porous structure in carbon membranes containing higher PBI portions are probably responsible for the improved discrimination between $H_2$ (2.89 Å) and $CO_2$ (3.3 Å) molecules. The enhanced separation performance of PBI/Matrimid carbon membranes for $H_2/CO_2$ is depicted in FIG. 8 which demonstrates that the improved membranes are positioned above the trade-off line.

The results obtained from a variation in blend composition indicate that carbon membranes can potentially offer a high separation performance for gases having a larger molecular size as well, e.g., for $N_2/CH_4$ and $CO_2/CH_4$ separation. Data revealed that good separation performance of carbon membranes for such gas pairs could be achieved by tuning the

TABLE 10

The effect of blend components on gas permeability and ideal selectivity of corresponding carbon membranes

| Membrane material & composition | Permeability (Barrer) | | | | | | Ideal Selectivity | | | | |
|---|---|---|---|---|---|---|---|---|---|---|---|
| | He | $H_2$ | $O_2$ | $N_2$ | $CH_4$ | $CO_2$ | $H_2/N_2$ | $N_2/CH_4$ | $CO_2/CH_4$ | $O_2/N_2$ | $H_2/CO_2$ |
| PBI/Matrimid (50/50 wt. %) | 112.12 | 324.0 | 10.96 | 1.26 | 0.278 | 36.6 | 257.1 | 4.53 | 131.65 | 8.7 | 8.85 |
| PBI/Torlon (50/50 wt. %) | 350.02 | 970.3 | 56.61 | 6.24 | 2.83 | 279 | 155.5 | 2.20 | 98.58 | 9.07 | 3.47 |
| PBI/P84 (50/50 wt. %) | 222.25 | 355.2 | 13.21 | 1.83 | 0.568 | 60.54 | 194.1 | 3.22 | 106.58 | 7.21 | 5.87 |

EXAMPLE 12

Carbonized PBI/Matrimid Blend Membrane Permeability Test

Figure 9:
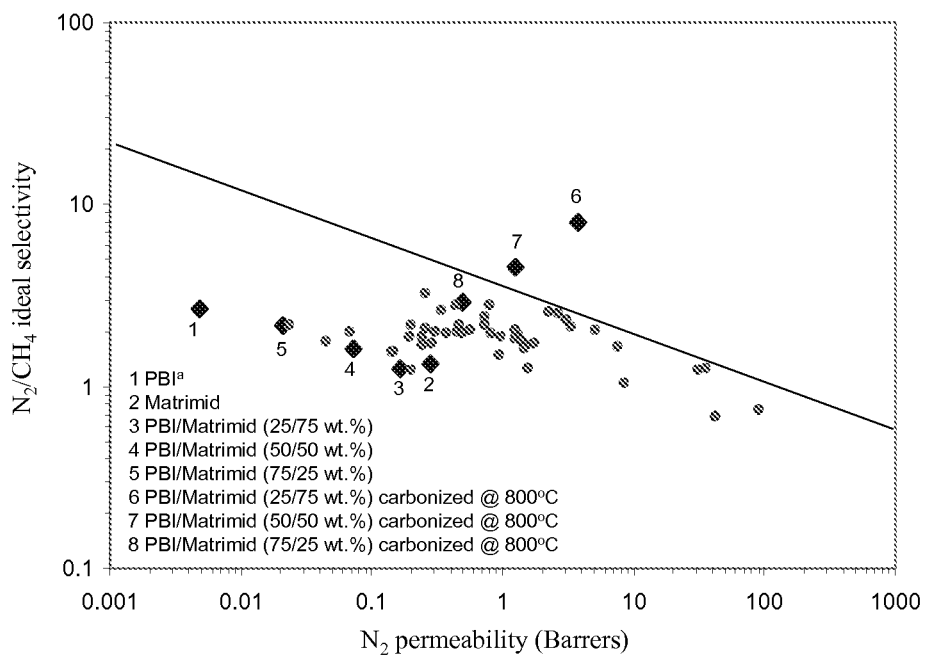
FIG. 9 is schematic diagram illustrating performance of PBI/Matrimid blends with various PBI/Matrimid weight ratios and of their corresponding carbon membranes for $N_2/CH4$ separation with respect to a trade-off line. The superscript "a" indicates that the data for point 1 is from Kumbharkar. The trade-off line was derived based on data from Cecopieri-Gómeza et al., J. Membr. Sci., 293 (2007) 53.

The effect of composition on the properties of carbon membranes derived from blends made of PBI and Matrimid was explored. Table 11 below provides the gas permeability and selectivity of three carbonized PBI/Matrimid blends with three different compositions.

blend composition, i.e., by lowering the PBI content. Surprisingly, the enhancement in performance was very eminent for $N_2/CH_4$ as the ideal selectivity of the carbon membrane derived from PBI/Matrimid (25/75 wt. %) was increased to about 8, which could be the highest ever reported selectivity for this gas pair. The conjunction of this high selectivity with high gas permeability ($P_{N2}$=3.78 Barrer) highlighted the importance of this achievement, as clearly depicted in FIG. 9.

A similar improvement trend was observed in the $CO_2/CH_4$ separation performance of the carbon membranes

TABLE 11

The effect of blend composition on gas permeability and selectivity of carbon membranes derived from PBI and Matrimid

| Membrane material & composition | Permeability (Barrer) | | | | | | Ideal Selectivity | | | | |
|---|---|---|---|---|---|---|---|---|---|---|---|
| | He | $H_2$ | $O_2$ | $N_2$ | $CH_4$ | $CO_2$ | $H_2/N_2$ | $N_2/CH_4$ | $CO_2/CH_4$ | $O_2/N_2$ | $H_2/CO_2$ |
| PBI/Matrimid (25/75 wt. %) | 194.10 | 660.2 | 30.39 | 3.78 | 0.473 | 96.47 | 174.6 | 7.99 | 203.95 | 8.04 | 6.84 |
| PBI/Matrimid (50/50 wt. %) | 112.12 | 324.0 | 10.96 | 1.26 | 0.278 | 36.60 | 257.1 | 4.53 | 131.65 | 8.70 | 8.85 |
| PBI/Matrimid (75/25 wt. %) | 62.83 | 148.4 | 4.22 | 0.49 | 0.170 | 16.13 | 302.8 | 2.88 | 94.88 | 8.61 | 9.20 |

Figure 10:
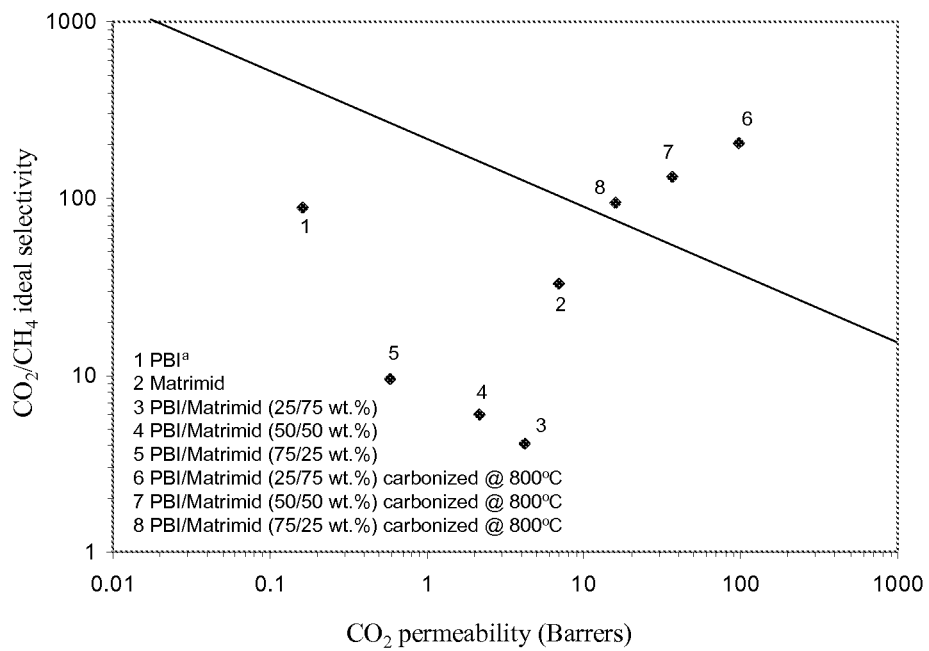
FIG. 10 is schematic diagram illustrating performance of PBI/Matrimid blends with various PBI/Matrimid weight ratios and of their corresponding carbon membranes for $CO_2/CH_4$ separation with respect to a trade-off line. The superscript "a" indicates that the data for point 1 is from Kumbharkar. The trade-off line was drawn based on data from Robeson, J. Membr. Sci., 62 (1991) 165 ("Robeson").

As clearly shown in the table, the higher the PBI content, the lower the permeability. The gas permeability was increased by 10-27 folds upon increasing the Matrimid content from 25% to 50% and 75%. The results also indicated that, compared to the other samples, the one with the highest PBI content was a more viable candidate for $H_2/CO_2$ separation, exhibiting the selectivity of about 9.2. The good performance can possibly be a result of the contribution of rigid PBI chains with high packing density (which can have a large impact on the chain configurations within the membrane conderived from the same precursors. FIG. 10 readily demonstrates the standing of the membranes' performance characteristics compared to the trade-off line for this gas pair.

Figure 11:
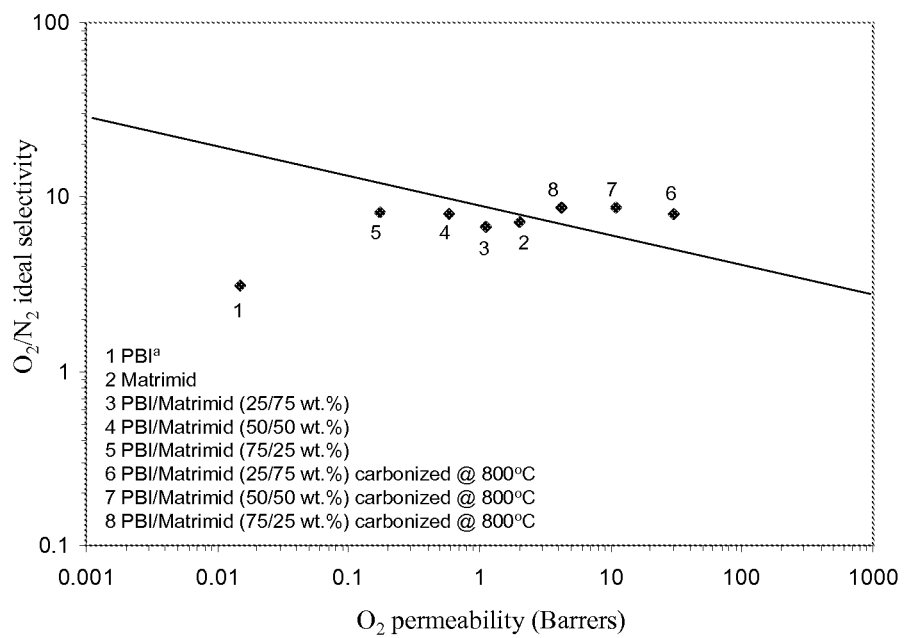
FIG. 11 is schematic diagram illustrating performance of PBI/Matrimid blends with various PBI/Matrimid weight ratios and of their corresponding carbon membranes for $O_2/N_2$ separation with respect to a trade-off line. The superscript "a" indicates that the data for point 1 is from Kumbharkar. The trade-off line was drawn based on data from Robeson.
Figure 12:
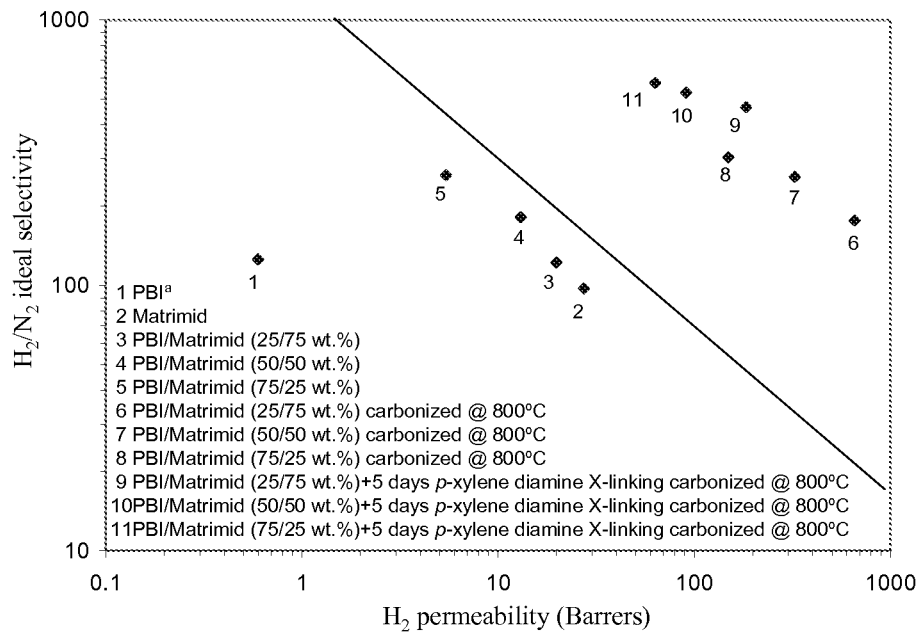
FIG. 12 is schematic diagram illustrating performance of PBI/Matrimid blends with various PBI/Matrimid weight ratios and of their corresponding carbon membranes for $H_2/N_2$ separation with respect to a trade-off line. The superscript "a" indicates that the data for point 1 is from Kumbharkar. The trade-off line was drawn based on data from Robeson.
Figure 13:
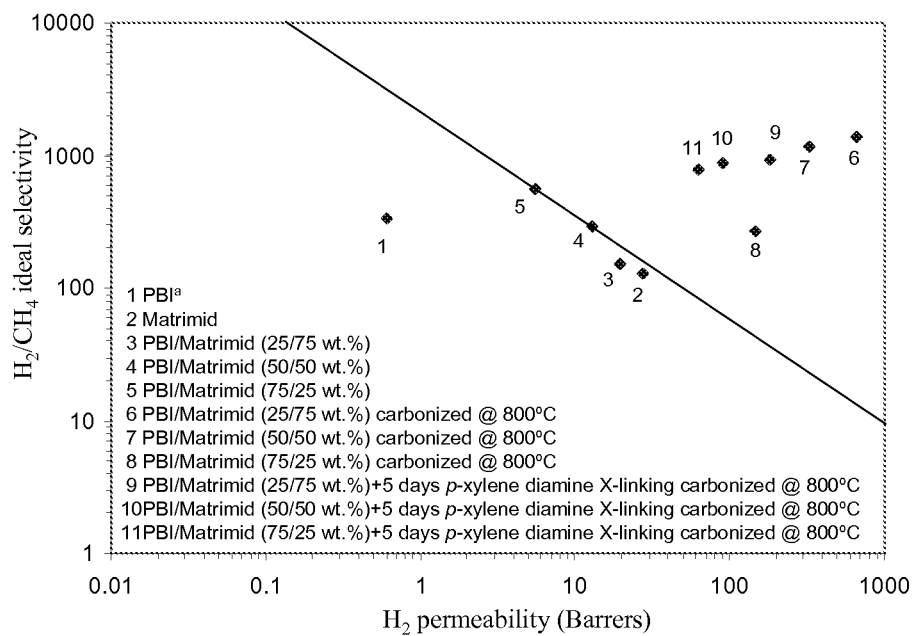
FIG. 13 is schematic diagram illustrating performance of PBI/Matrimid blends with various PBI/Matrimid weight ratios and of their corresponding carbon membranes for $H_2/CH_4$ separation with respect to a trade-off line. The superscript "a" indicates that the data for point 1 is from Kumbharkar. The trade-off line was drawn based on data from Robeson.

The developed carbon molecular sieve membranes from blends of PBI and Matrimid, prepared with the procedures described herein, can be applied for nitrogen removal from natural gas. FIGS. 11 to 13 illustrate the separation performance of the carbon membranes for the $O_2/N_2$, $H_2/N_2$ and $H_2/CH_4$ pairs, respectively.

EXAMPLE 13

Carbon Membrane Derived from Cross-Linked PBI/Matrimid Blend and Permeability Test Prior to carbonization, PBI/Matrimid blend membranes with various compositions were chemically modified with p-xylene diamine, as described in Example 6. The chemical structure of the cross-linking agent and proposed mechanisms for cross-linking process are shown in FIG. 6.

P-xylene diamine was selected as the chemical agent for cross-linking due to its high degree of solubility in a non-solvent medium for the polymers (e.g., methanol) and high reaction efficiency. The carbon membranes derived from the cross-linked precursors were tested. The gas permeability and selectivity values obtained are provided in Table 12 below.

TABLE 12

The effect of application of a 5-day cross-linking modification by p-xylene diamine (PXDA) on the gas transport properties of blend carbon membranes with various compositions

| Membrane material & composition | Permeability (Barrer) | | | | | | Ideal Selectivity | | | | |
|---|---|---|---|---|---|---|---|---|---|---|---|
| | He | $H_2$ | $O_2$ | $N_2$ | $CH_4$ | $CO_2$ | $H_2/N_2$ | $N_2/CH_4$ | $CO_2/CH_4$ | $O_2/N_2$ | $H_2/CO_2$ |
| PBI/Matrimid (25/75 wt. %) | 71.16 | 182.7 | 2.615 | 0.392 | 0.195 | 11.00 | 466.1 | 2.01 | 56.41 | 6.67 | 16.61 |
| PBI/Matrimid (50/50 wt. %) | 34.77 | 91.0 | 0.826 | 0.172 | 0.104 | 3.71 | 529.1 | 1.65 | 30.50 | 4.80 | 24.52 |
| PBI/Matrimid (75/25 wt. %) | 23.91 | 63.2 | 0.357 | 0.109 | 0.081 | 1.89 | 579.8 | 1.34 | 13.23 | 3.28 | 33.44 |

Comparison of the results with their corresponding unmodified counterparts (Table 11) indicated a significant decline in permeability values upon modification. Additionally, the selectivity values were also affected and two distinct trends could be recognized. On the one hand, the selectivity for the gas pairs with negligible difference in molecular sizes (e.g. $N_2/CH_4$, $CO_2/CH_4$, and $O_2/N_2$) declined. On the other hand, favorable enhancements were achieved in selectivity for gas pairs possessing larger differences in molecular sizes. More specifically, the gas selectivity for both $H_2/N_2$ and $H_2/CO_2$ pairs was increased to 466.1~579.1 and 16.61~33.44, respectively, for different compositions.

EXAMPLE 14

Preparation of Dual-Layer Hollow Fibers of Matrimid/PBI Blend Membrane and Polysulfone Substrate Dual-layer hollow fibers were produced by adopting the dry jet wet spinning process. FIG. 15 depicts the schematic diagram of the spinning set-up.

A polymer blend was prepared and used as the outer-layer of dual-layer hollow fibers.

Figure 14:
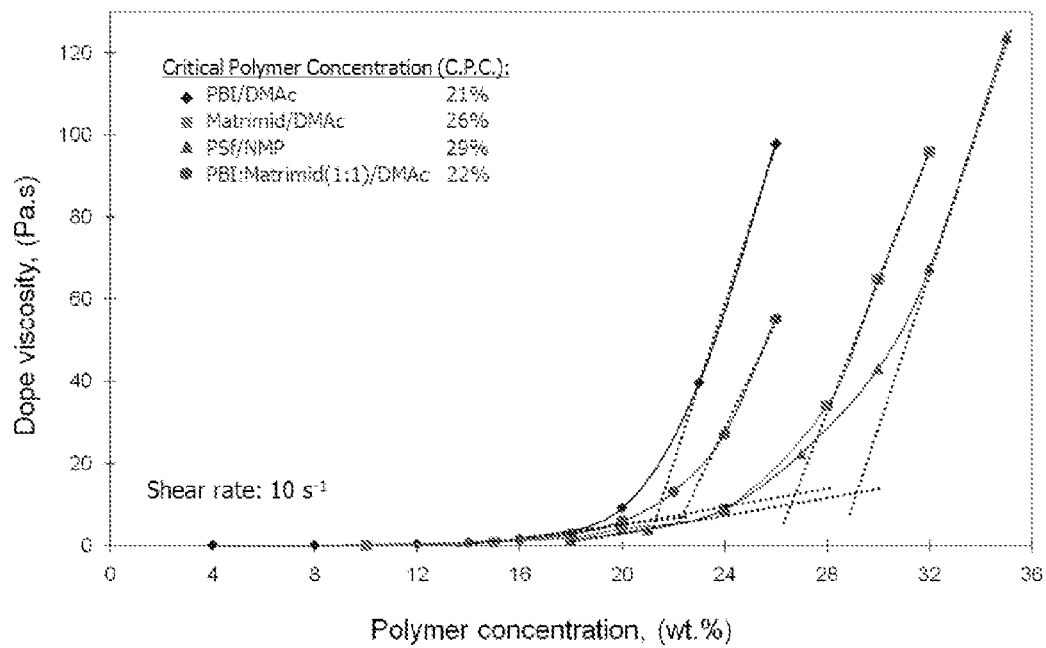
FIG. 14 is a schematic diagram illustrating dope viscosity as a function of polymer concentration in a solvent.

The outer-layer dope contained PBI (Hoechst Celanese Corporation, N.J., 25.6 wt % PBI, 72.4 wt % N,N-dimethylacetimide (DMAc), and 2.0 wt % LiCl) and Matrimid® 5218 (Vantico (Luxemburg)) with PBI:Matrimid weight ratio being 1:1. The dope was prepared according to the method described in Chung et al., J. Membr. Sci., 133 (1997) 161 or Cao et al., J. Membr. Sci., 209 (2002) 309. The inner-layer dope contained polysulfone (UDEL, Solvay Advanced Polymers, Singapore). FIG. 14 demonstrates the viscosity of the dope as a function of polymer concentration measured using an ARES rheometer at the shear rate of $10_{S-1}$. This figure also includes the critical polymer concentration (c.p.c.) values identified for each dope. Based on these results, the concentration of 22 wt. % was selected for the preparation of the outer-layer dope to ensure achieving the desired morphology in the functional layer. On the other hand, the concentration of inner dope was adjusted to 25 wt. % that is sufficiently lower than its c.p.c. value (i.e., 29 wt. %) with the objective of minimizing the effect of substructure resistance on the membranes' performance. Both dope solutions were prepared by addition of stipulated amounts of polymers into the respective solvent followed by rigorous stirring to ensure full dissolution. Both the outer-layer dope and the inner-layer dope were degassed in syringe pumps for at least 24 hrs prior to spinning.

As shown in FIG. 15, three high precisions syringe pumps (ISCO, USA) were employed to co-extrude, through the spinneret, the outer-layer dope (through the outer channel of spinneret d) and inner-layer dope (through the inner channel of spinneret d) as well as the bore fluid (through the bore fluid channel of spinneret d), at specified flow rates. All solutions were filtered before entering the spinneret channels. Nascent hollow fibers were passed through the coagulation bath and then were collected around a rotating drum. This drum was equipped with various gears enabling to apply the take-up speed through adjusting the fiber collection speed. The bore fluid was a mixture of NMP/water (95/5 wt. %) whereas the external coagulant was purely from tap water. As-spun hollow fibers collected from the drum were cut into small pieces and retained in clean water for about two days. This was followed by the solvent exchange through which hollow fibers were immersed in methanol for three times, each one lasting for about 30 minutes. Afterwards, the above steps were repeated using hexane. The fibers were finally dried in air and at ambient temperature. The effect of various parameters was examined during the spinning process. Table 13 provides a summary of the spinning parameters and conditions for the hollow fiber samples.

TABLE 13

Spinning parameters and conditions used in preparation of dual-layer hollow fibers

| Sample ID | Outer dope flow rate (cm³/min) | Inner dope flow rate (cm³/min) | Bore fluid flow rate (cm³/min) | Air gap (cm) | Take-up speed (cm/min) | Fiber collection state |
|---|---|---|---|---|---|---|
| A | 0.20 | 2.00 | 1.00 | 0.0 | 327 | free fall |
| B | 0.40 | 2.00 | 1.00 | 0.0 | 327 | free fall |
| C | 0.20 | 2.00 | 1.00 | 1.0 | 371 | free fall |

TABLE 13-continued

Spinning parameters and conditions used in preparation of dual-layer hollow fibers

| Sample ID | Outer dope flow rate (cm$^3$/min) | Inner dope flow rate (cm$^3$/min) | Bore fluid flow rate (cm$^3$/min) | Air gap (cm) | Take-up speed (cm/min) | Fiber collection state |
|---|---|---|---|---|---|---|
| D | 0.20 | 2.00 | 1.00 | 1.0 | 681 | Elongational draw |
| X | 0.20 | 2.00 | 1.00 | 2.0 | 449 | free fall |
| Y | 0.20 | 2.00 | 1.00 | 3.0 | 560 | free fall |

Outer dope: PBI/Matrimid (1:1), 22 (wt. %) in DMAc;
Inner dope: Polysulfone, 25 (wt. %) in NMP;
Spinning temperature: 25° c.

Silicone rubber coating was applied in order to seal the membrane's defects, if any. The coating solution was prepared by the addition of silicone rubber (Sylgard-184) into hexane (2 wt. %) followed by rigorous stirring. Hollow fibers, in the form of modules, were then immersed in the solution for 2 minutes. For chemical modification, hollow fibers were immersed in solutions of p-xylylenediamine in methanol (10 wt. %) for stipulated period of time. The fibers were then removed and rinsed in fresh methanol in order to strip away unreacted molecules from the surface.

EXAMPLE 15

Dual-Layer Hollow Fiber Morphological Characterizations and Permeability Test

Morphology of dual-layer hollow fibers was examined using a JEOL JSM-5600LV scanning electron microscope and a JEOL JSM-6700F field emission scanning electron microscope. Samples were prepared by fracturing in liquid nitrogen and then coated with platinum before analysis. The gas permeation properties of hollow fibers were tested using the variable-pressure constant-volume method as described in details by Li et al., J. Membr. Sci., 245 (2004) 53. The feed gas was supplied to the shell side of the fiber while the lumen of the fiber was connected to a vacuumed chamber. All gas permeation tests were carried out at 35° C. with the testing pressure of 10 (atm) for $CH_4$ and $CO_2$, and 3.5 (atm) for $H_2$. During the $CO_2$ plasticization analysis, the testing pressure for $CO_2$ was raised up to 20 atm.

Figure 16:
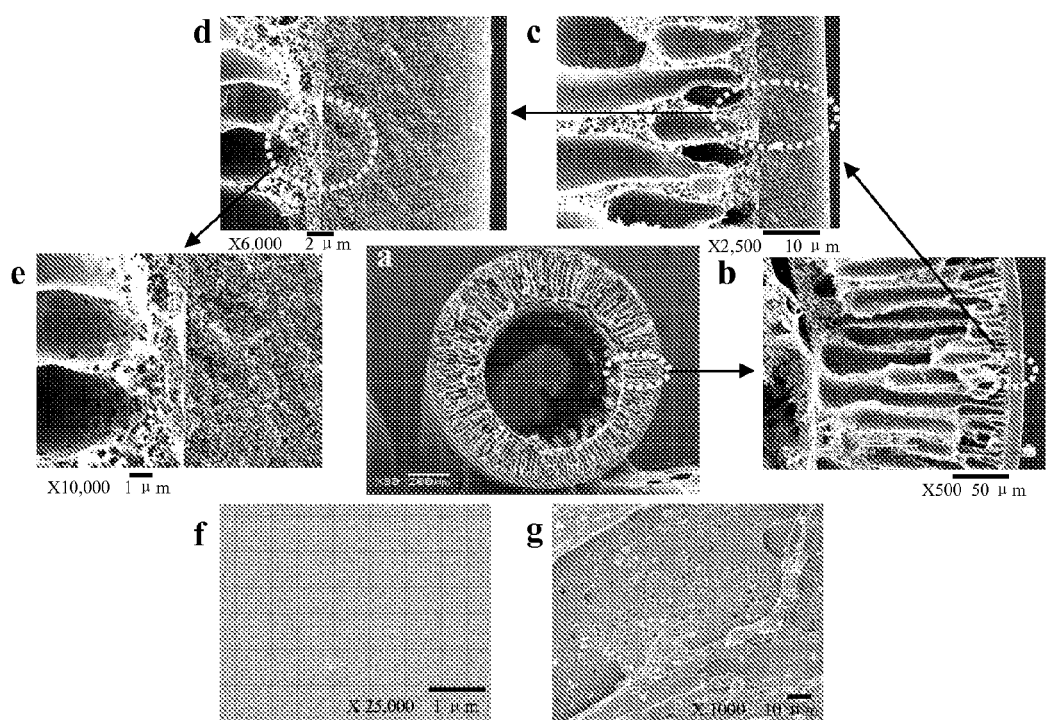
FIGS. 16(a)-(g) are scanning electron microscopy (SEM) images illustrating various morphological aspects of a typical dual-layer hollow fiber (sample B): (a) cross-section; (b)-(e) interface region of inner and outer layers at different magnitudes; (f) outer surface of the outer layer (g) inner surface of the inner layer.

FIG. 16 illustrates the typical morphology of as-spun dual-layer hollow fibers (sample B from Example 14). The analysis of SEM images revealed the presence of no major differences in overall morphology of fabricated hollow fibers, from sample A to sample Y. However, two distinct morphologies could be seen for the inner and outer layers. According to FIG. 16 (d and e), the outer layer of the hollow fiber was in the form of an asymmetric structure; constructed of spongy-like cells as the dominant structure surrounded by a thin dense selective layer at the outermost edge. No macrovoid could be found in the cross-section morphology of the outer layer. On the other hand, the inner supporting layer was considerably larger in thickness and its cross section was almost entirely occupied with open cell type pores disrupted by finger-like macrovoids. The morphological difference between the inner and outer layers can be explained by taking into account the chemistry of dope components and coagulation agent. Table 14 below provides the solubility parameter values for the polymers, solvents and the coagulant.

TABLE 14

Solubility parameters of solvents, coagulationg agent, and polymers.*

| Component | Solubility parameter, δ t (J · cm-3)1/2 |
|---|---|
| NMP | 22.9 |
| DMAc | 22.7 |
| Water | 47.8 |
| PBI | 23.3 |
| Matrimid | 22.9 |
| Polysulfone | 18.0 |

*data obtained and calculated according to the following three references: D. W. Van Krevelen, Properties of Polymers, Elsevier, Amsterdam, 1990; A. F. M. Barton, Solubility parameters and other cohesion parameters, CRC Press, 1983; and C. M. Hansen, Hansen Solubility Parameter, A User's Handbook, CRC Press, 1999.

According to this table, one could find a negligible difference in the solubility parameters of NMP and DMAc. Thus, without wishing to be bound by theory, these two solvents to exhibit similar interaction with water, especially in terms of diffusion coefficient during the phase inversion. On the other hand, the data indicate the presence of a smaller difference in the solubility parameters of water and the polymer blend compared to that of water and polysulfone. The relatively low solubility difference between the polymer blend and water promotes occurrence of a slower precipitation rate for the outer layer. In addition, the characteristics of strong hydrogen bond provided by PBI and high viscosity of the outer layer dope may inhibit macrovoid formation at the outer layer. On the other hand, the greater solubility parameter difference between water and polysulfone, the low viscosity of the inner dope, and hydrophobicity of polysulfone all increase the tendency for macrovoid formation in the structure of inner layer through formation of unbalanced localized stresses, rapid rate of solvent exchange and accelerated precipitation rate. Unexpectedly, as-spun hollow fibers were free from any delamination at the interface between the inner and outer layers, as shown in FIG. 16 (e). As shown in FIG. 16 (f), the outer circumferential surface of the outer layer was smooth and dense with some minor defects. These defects could be formed at the spinning stage or during the sample preparation.

Figure 17:
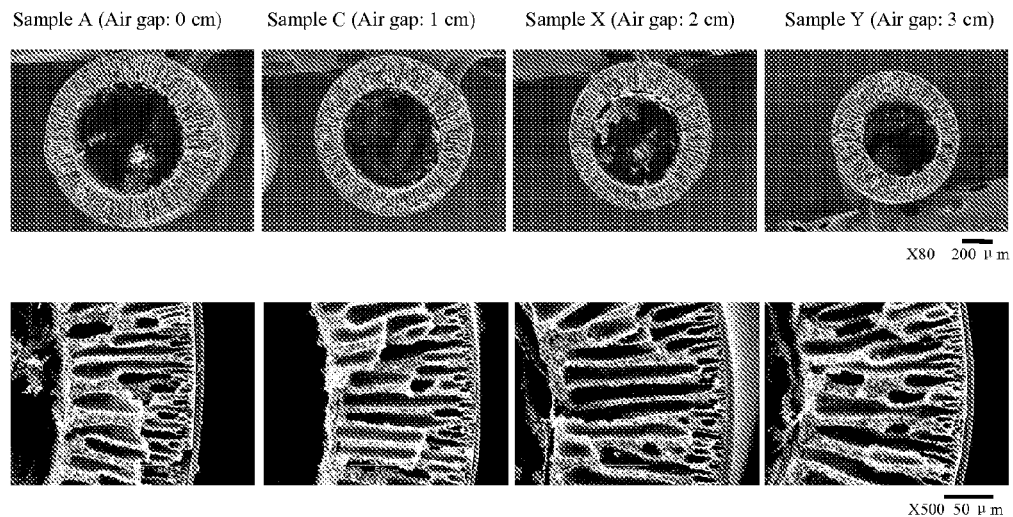
FIG. 17 shows SEM images of the cross sections of dual-layer hollow fibers spun at different air gap distances.

FIG. 17 shows the cross-sectional SEM images of dual-layer hollow fibers spun at various air-gap distances. Images in the lower row demonstrate the cross-section morphology of corresponding sample at a higher magnification. Comparison of the overall morphology of the hollow fibers revealed no major difference among the samples. Hollow fibers were examined for their gas transport properties and separation performance. Table 15 below provides the results of gas permeation tests for the fibers spun at different air gaps.

TABLE 15

The effect of air gap distance on the gas permeance and separation factor of dual-layer hollow fibers.

| Sample ID | Air gap (cm) | Permeance (GPU) $H_2$ | $CH_4$ | $CO_2$ | Selectivity (α) $H_2/CO_2$ | $CO_2/CH_4$ |
|---|---|---|---|---|---|---|
| Before silicone rubber coating | | | | | | |
| A | 0.0 | 43.22 | 1.458 | 7.34 | 5.89 | 5.04 |
| C | 1.0 | 30.29 | 3.542 | 4.90 | 6.18 | 1.38 |
| X | 2.0 | 36.51 | 2.127 | 5.48 | 6.66 | 2.58 |
| Y | 3.0 | 38.67 | 1.850 | 5.65 | 6.85 | 3.05 |
| After silicone rubber coating | | | | | | |
| A | 0.0 | 31.55 | 0.223 | 4.37 | 7.22 | 19.60 |
| C | 1.0 | 17.84 | 0.199 | 1.99 | 8.96 | 10.01 |
| X | 2.0 | 26.45 | 0.273 | 2.49 | 10.62 | 9.12 |
| Y | 3.0 | 29.26 | 0.328 | 2.63 | 11.11 | 8.03 |

Spinning Conditions:
Outer dope: PBI/Matrimid (1:1), 22 (wt. %) in DMAc;
Inner dope: Polysulfone 25 (wt. %) in NMP;
Outer dope flow rate: 0.20 cm³/min;
Inner dope flow rate: 2.00 cm³/min;
Bore fluid flow rate: 1.00 cm³/min.

Data in this Table are categorized into two groups of before and after the application of silicone rubber coating on the external surface of the hollow fibers. A relatively poor separation performance could be seen for the pristine membranes indicating the possible presence of defective sites in the membranes. Therefore, silicone rubber coating was applied in order to exclude the effects of defects and imperfections in the analysis of the performance of the membranes. Analysis of data for the samples after silicone rubber coating revealed a significant decline in the gas permeance of hollow fibers upon switching from wet to dry jet spinning possibly because of elongation stretch and die swelling (discussed below). However, it was noticed that the provision of air-gap to spinning process resulted in a membrane with considerably higher performance for $H_2/CO_2$ separation, with selectivity of 8.96 at an air-gap of 1 cm and reaching to about 11.11 for 3 cm gap. However, the effect was declining in terms of the selectivity for $CO_2/CH_4$. Unexpectedly, the separation performance for $H_2/CO_2$ (α=11.11) exceeded the intrinsic value reported for the dense flat membrane made from the outer layer material. See Table 16 below.

TABLE 16

The intrinsic transport properties of the dense flat membrane made from the polymer blend and respective individual polymers[a]

| Membrane constituents | Permeability (Barrer) $H_2$ | $CH_4$ | $CO_2$ | Ideal Selectivity $H_2/CO_2$ | $CO_2/CH_4$ |
|---|---|---|---|---|---|
| Matrimid | 27.16 | 0.210 | 7.00 | 3.88 | 33.33 |
| PBI/Matrimid (1:1) | 13.06 | 0.045 | 2.16 | 6.05 | 48.00 |
| PBI | 0.6 | 0.0018 | 0.16 | 3.75 | 88.88 |

Testing Temperature: 35° C.
[a]Data reproduced from Tables 1 and 3 above and Hosseini et al., Polymer, 49 (2008) 1594.

Table 17 below provides the results of gas permeance and separation factor for membranes spun at the free fall state and the one with elongational drawing, before and after the application of silicone rubber coating. In the free fall state, the take-up (collection) drum rotates not more quickly than the fiber reaches the drum. As a result, the fiber is not stretched when being collected. In an elongational drawing, the drum rotates more quickly than the fiber reaches the drum, therefore stretching the fiber while collecting it.

TABLE 17

The effect of application of elongational drawing on the gas permeance and separation factor of dual-layer hollow fibers

| Sample ID | Fiber collection state | Permeance (GPU) $H_2$ | $CH_4$ | $CO_2$ | Selectivity (α) $H_2/CO_2$ | $CO_2/CH_4$ |
|---|---|---|---|---|---|---|
| Before silicone rubber coating | | | | | | |
| C | Free fall | 30.29 | 3.542 | 4.90 | 6.18 | 1.38 |
| D | Elongational draw | 39.00 | 0.527 | 5.76 | 6.77 | 10.93 |
| After silicone rubber coating | | | | | | |
| C | Free fall | 17.84 | 0.199 | 1.99 | 8.96 | 10.01 |
| D | Elongational draw | 32.66 | 0.115 | 4.81 | 6.79 | 41.81 |

Spinning Conditions:
Outer dope: PBI/Matrimid (1:1), 22 (wt. %) in DMAc;
Inner dope: Polysulfone 25 (wt. %) in NMP;
Outer dope flow rate: 0.20 cm³/min;
Inner dope flow rate: 2.00 cm³/min;
Bore fluid flow rate: 1.00 cm³/min;
Air gap: 1.0 cm.

Unexpectedly, the results indicated that hollow fiber spun with elongational drawing exhibited an improved permeance for hydrogen and carbon dioxide, but reduced permeance for $CH_4$. These changes consequently resulted in improvements in separation performance of membranes for $CO_2/CH_4$ with the selectivity of 41.81, but reduced $H_2/CO_2$ separation performance from 8.96 down to 6.79. The mixed gas selectivity of this membrane for $CO_2/CH_4$ was 26.63 when tested using a mixed gas of $CO_2$—$CH_4$ (1:1) as the feed under 10 atm and at room temperature.

The above phenomena indicated that spinning with high air gaps or with elongational drawing, can be employed for the fabrication of hollow fibers with specific purposes. In other words, fibers spun in a high air-gap distance were more favorable for $H_2/CO_2$ separation (αH2/CO2=11.11), while those spun under elongational drawing was more suitable for $CO_2/CH_4$ separation (αCO2/CH4=41.81).

Table 18 below provides the data for the gas permeance and selectivity of the hollow fibers spun at different outer dope flow rates.

TABLE 18

The effect of variation in outer dope flow rates on the gas permeance and separation factor of dual-layer hollow fibers spun at the air gap distance of 0 cm.

| Sample ID | Outer dope flow rate (cm³/min) | Permeance (GPU) $H_2$ | $CH_4$ | $CO_2$ | Selectivity (α) $H_2/CO_2$ | $CO_2/CH_4$ |
|---|---|---|---|---|---|---|
| Before silicone rubber coating | | | | | | |
| A | 0.20 | 43.22 | 1.458 | 7.34 | 5.89 | 5.04 |
| B | 0.40 | 22.07 | 0.090 | 4.22 | 5.23 | 46.84 |
| After silicone rubber coating | | | | | | |
| A | 0.20 | 31.55 | 0.223 | 4.37 | 7.22 | 19.60 |
| B | 0.40 | 18.89 | 0.085 | 2.97 | 6.36 | 34.82 |

Spinning Conditions:
Outer dope: PBI/Matrimid (1:1), 22 (wt. %) in DMAc;
Inner dope: Polysulfone 25 (wt. %) in NMP;
Inner dope flow rate: 2.00 cm³/min;
Bore fluid flow rate: 1.00 cm³/min.

The results indicated that an increase in outer dope flow rate brought about considerable reductions in gas permeance of the hollow fibers. Unexpectedly, a more pronounced drop was observed in permeance toward $CH_4$ compared to other gases. For instance, sample B exhibited a $CH_4$ permeance of 0.090 GPU which was about 16.2 times lower than its counterpart membrane (sample A). The above trends of changes in gas permeance subsequently affected the separation performance of hollow fibers. As shown in Table 18, an increase in outer dope flow rate resulted in substantial improvements in $CO_2/CH_4$ selectivity of the membranes reaching to the value of 46.84. However, there is a reduction in $H_2/CO_2$ separation performance. The mixed gas selectivity of this membrane for $CO_2/CH_4$ was 35.63 when tested using a mixed gas of $CO_2$—$CH_4$ (1:1) as the feed under 10 atm at room temperature.

Application of silicone rubber coating on fibers spun with outer dope flow rate of 0.40 (cm3·min-1) resulted in further declines in gas permeance. Silicone rubber coating was found more effective in improving the H2/CO2 separation (from 5.23 to 6.36) of hollow fibers.

EXAMPLE 16

Analysis of the Anti-Plasticization Behavior of Dual-Layer Hollow Fibers

One of the important factors in evaluation of the long term performance and reliability of the gas separation polymeric membranes is their stability against the plasticization. It is often reported that the plasticization is caused by highly polar gases such as CO2 molecules especially when present at relatively high partial pressures. The incipient point for the plasticization is known as plasticization pressure ($P_{plast}$). Plasticization phenomena are deteriorative to membrane performance through dissolution of gas molecules into the polymer matrix followed by disruption of chain packing and enhancement of inter-segmental mobility. In this respect, dual-layer hollow fibers were examined in terms of their anti-plasticization properties. This was achieved through monitoring the trend of changes in permeance of membranes toward CO2 at various feed gas pressures up to 15 (atm); the highest pressure that membranes could withstand. The reason for collapse could be the relatively high D/Δh ratio (D: membrane diameter; Δh: wall thickness) and its detrimental effect on the mechanical stability of the hollow fibers. See McKelvey et al., J. Membr. Sci., 124 (1997) 223 and Ekiner et al., J. Membr. Sci., 53 (1990) 259.

Figure 18:
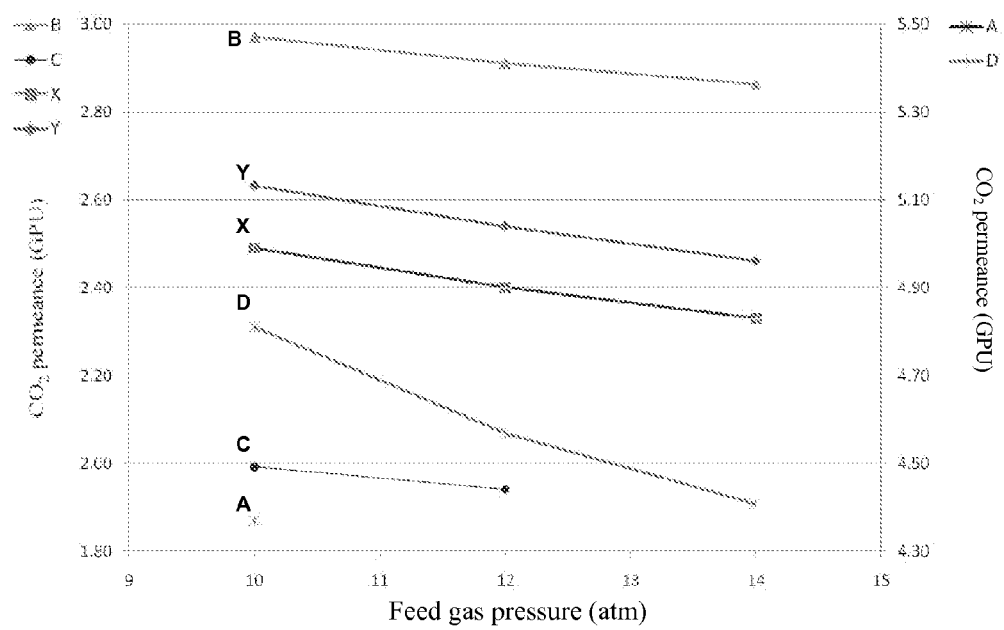
FIG. 18 is a schematic diagram illustrating the trend of changes in $CO_2$ permeance as a function of upstream pressure for silicone rubber coated dual-layer hollow fibers.

As shown in FIG. 18, upon increase in feed gas pressure, the $CO_2$ permeance of the hollow fibers was gradually decreased which could be attributed to the saturation of Langmuir sites. This suggested the prevalence of good resistance against the plasticization in fabricated fibers, as compared to dense flat membranes prepared from Matrimid which tend to plasticize at pressures around 12-15 (atm) witnessed by an upward reflection in the membrane's permeability. See Tin et al., J. Membr. Sci., 225 (2003) 77.

EXAMPLE 17

Effect of Chemical Modification on the Gas Transport Properties of Dual-Layer Hollow Fibers Data included in Table 19 below shows that the chemical cross-linking modification greatly affected the properties of the selected hollow fibers, even upon treatment for a short period of time.

TABLE 19

The effect of chemical cross-linking modification on the gas permeance and separation factor of dual-layer hollow fibers

| Sample ID and Cross-linking period | Permeance (GPU) | | | Selectivity (α) | |
|---|---|---|---|---|---|
| | $H_2$ | $CH_4$ | $CO_2$ | $H_2/CO_2$ | $CO_2/CH_4$ |
| Y-0 Sec (pristine sample) | 38.67 | 1.850 | 5.65 | 6.85 | 3.05 |
| Y-30 Sec | 6.10 | 0.187 | 0.421 | 14.49 | 2.25 |
| Y-1.0 min | 5.13 | 0.173 | 0.368 | 13.94 | 2.13 |
| Y-5.0 min | 0.562 | 0.035 | 0.061 | 9.21 | 1.74 |

Spinning Conditions:
Outer dope: PBI/Matrimid (1:1), 22 (wt. %) in DMAc;
Inner dope: Polysulfone, 25 (wt. %) in NMP.

The gas permeance of the hollow fibers was reduced, in the range of about 84-93%, after cross-linking for only 30 seconds. This consequently brought about membranes with improved performance for $H_2/CO_2$ separation. This could clearly highlight the effective role of cross-linking on promoting the diffusivity selectivity through formation of a tighter chain packing, restriction in chain mobility and interstitial space among the polymer chains in the dense functional layer of the membrane. As a result, the separation performance of the membranes for $CO_2/CH_4$ was negatively affected due to the diminished size-exclusion capability of the membranes for molecules with close kinetic diameter (i.e., $CH_4$ and $CO_2$). In addition, data in Table 19 also revealed that prolonging the cross-linking period brought about undesirable effects on both gas permeance and separation performance of the hollow fibers.

OTHER EMBODIMENTS

All of the features disclosed in this specification may be combined in any combination. Each feature disclosed in this specification may be replaced by an alternative feature serving the same, equivalent, or similar purpose. For example, the membranes of this invention can be applied for natural gas sweetening, nitrogen and/or $CO_2$ removal from natural gas, and $CO_2$ capture to mitigate green house effects. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:
1. A polymeric membrane comprising
a first polymer having monomers each containing an imidazole group, and
a second polymer, the first and second polymers being a miscible polymer blend and the first polymer constituting more than 20% of the polymer blend by weight, wherein the polymeric membrane, suitable for separating gases, has a thickness between 20 μm and 100 μm, and the first polymer, the second polymer, or both are carbonized, or cross-linked by a cross-linking agent of the following formula:

in which R is an aliphatic or aromatic group, and each of X and Y, independently, is —$CH_2Cl$, —$CH_2Br$, —$CH_2I$, or —$CH_2NH_2$.

2. The polymeric membrane of claim 1, wherein the first polymer is a polybenzimidazole.

3. The polymeric membrane of claim 2, wherein the polybenzimidazole includes poly [2,2'-(1,3-phenylene)-5,5'-bibenzimidazole].

4. The polymeric membrane of claim 1, wherein the second polymer is a polyimide, a polysulfone, a polyethersulfone, a polyarylate, a polyketone, a polyetherketone, or a polyamide-imide.

5. The polymeric membrane of claim 1, wherein the second polymer is poly [3,3',4,4'-benzophenone tetracarboxylic dianhydride and 5(6)-amino-1-(4'-aminophenyl-1,3-trimethylindane)].

6. The polymeric membrane of claim 1, wherein R in phenylene.

7. The polymeric membrane of claim 1, wherein the membrane has a gas selectivity greater than 15 for $H_2/CO_2$ separation.

8. The polymeric membrane of claim 1, wherein the membrane is in the form of a flat sheet.

9. A hollow fiber comprising:
a lumen,
a polymeric membrane, suitable for separating gases, defining the lumen, the membrane including a first polymer and a second polymer, and
a porous tubular substrate, a circumferential surface of which is in contact with a circumferential surface of the polymeric membrane,
wherein the first and second polymers are a polymer blend, and the first polymer, the second polymer, or both are carbonized, or cross-linked by a cross-linking agent of the following formula:

X—R—Y, in which R is an aliphatic or aromatic group, and each of X and Y, independently, is —$CH_2Cl$, —$CH_2Br$, —$CH_2I$, or —$CH_2NH_2$.

10. The hollow fiber of claim 9, wherein the first and second polymers are a miscible polymer blend.

11. The hollow fiber of claim 9, wherein the first polymer has monomers each containing an imidazole group.

12. The hollow fiber of claim 9, wherein the first polymer is a polybenzimidazole.

13. The hollow fiber of claim 12, wherein the second polymer is a polyimide, a polysulfone, a polyethersulfone, a polyarylate, a polyketone, a polyetherketone, or a polyamide-imide.

14. The hollow fiber of claim 9, wherein the polymeric membrane has a thickness between 0.01 μm and 100 μm.

15. The hollow fiber of claim 9, wherein the outer circumferential surface of the substrate is in contact with the inner circumferential surface of the polymeric membrane.

16. The hollow fiber of claim 9, wherein the substrate is formed of a third polymer selected from a group consisting of polysulfone, a polyethersulfone, a polyarylate, a polyketone, a polyetherketone, a polyamide-imide, a polyimide, a polyamide, cellulose acetate, and a polybenzimidazole.

17. The polymeric membrane of claim 1, wherein the first polymer, the second polymer, or both are carbonized.

18. The polymeric membrane of claim 17, wherein the first polymer, the second polymer, or both are cross-linked.

* * * * *